(12) United States Patent
Hwang

(10) Patent No.: US 9,075,760 B2
(45) Date of Patent: Jul. 7, 2015

(54) NARRATION SETTINGS DISTRIBUTION FOR CONTENT CUSTOMIZATION

(75) Inventor: Douglas Hwang, New York, NY (US)

(73) Assignee: Audible, Inc., Newark, NJ (US)

(*) Notice: Subject to any disclaimer, the term of this patent is extended or adjusted under 35 U.S.C. 154(b) by 366 days.

(21) Appl. No.: 13/465,871

(22) Filed: May 7, 2012

(65) Prior Publication Data

US 2014/0258462 A1    Sep. 11, 2014

(51) Int. Cl.
- G06F 13/00 (2006.01)
- G06F 15/16 (2006.01)
- G06Q 50/00 (2012.01)

(52) U.S. Cl.
CPC ............... *G06F 15/16* (2013.01); *G06Q 50/01* (2013.01)

(58) Field of Classification Search
CPC .............. H04L 29/08072; H04L 29/06; H04L 29/0809; H04L 29/08981; G06Q 30/02; G06F 15/16
USPC .......................................................... 709/219
See application file for complete search history.

(56) References Cited

U.S. PATENT DOCUMENTS

| | | | |
|---|---|---|---|
| 5,351,189 A | 9/1994 | Doi et al. | |
| 5,657,426 A | 8/1997 | Waters et al. | |
| 5,737,489 A | 4/1998 | Chou et al. | |
| 5,978,754 A | 11/1999 | Kumano | |
| 6,208,956 B1 | 3/2001 | Motoyama | |
| 6,356,922 B1 | 3/2002 | Schilit et al. | |
| 6,766,294 B2 | 7/2004 | MacGinite et al. | |
| 7,003,515 B1 | 2/2006 | Glaser et al. | |
| 7,107,533 B2 | 9/2006 | Duncan et al. | |
| 7,210,102 B1 | 4/2007 | Gordon et al. | |
| 7,231,351 B1 | 6/2007 | Griggs | |
| 7,610,204 B2 | 10/2009 | Ruback et al. | |
| 7,693,719 B2 | 4/2010 | Chu et al. | |

(Continued)

FOREIGN PATENT DOCUMENTS

| EP | 2689342 | 1/2014 |
|---|---|---|
| EP | 2689346 | 1/2014 |

(Continued)

OTHER PUBLICATIONS

Simonite, Tom, "Software Translates Your Voice into Another Language," Technology Review, Mar. 9, 2012, available at www.technologyreview.com/computing/39885/page1, last accessed Mar. 14, 2012.

(Continued)

*Primary Examiner* — Robert B Harrell
(74) *Attorney, Agent, or Firm* — Knobbe, Martens, Olson & Bear, LLP

(57) ABSTRACT

A content customization service is disclosed. A user computing device and/or a content customization server may customize a narration associated with an item of content at the request of a listener or a rights-holder. One or more user interfaces may be provided to facilitate these requests. Some examples of customization include specifying settings for the language, accent, mood, or speaker of the narration. Other examples of customization include specifying settings for the bass, treble, pitch, pace, or contrast of the narration. These settings may be collected as narration settings information. The content customization service may distribute this information over an electronic network. The content customization service may provide recommendations to help users select customizations.

24 Claims, 10 Drawing Sheets

(56) References Cited

U.S. PATENT DOCUMENTS

| | | |
|---|---|---|
| 7,925,993 B2 | 4/2011 | Williams |
| 8,106,285 B2 | 1/2012 | Gerl et al. |
| 8,109,765 B2 | 2/2012 | Beattie et al. |
| 8,131,545 B1 | 3/2012 | Moreno et al. |
| 8,131,865 B2 | 3/2012 | Rebaud et al. |
| 8,150,864 B2 | 4/2012 | Williams et al. |
| 8,412,718 B1 | 4/2013 | Bilger |
| 8,442,423 B1 | 5/2013 | Ryan et al. |
| 8,515,737 B2 | 8/2013 | Allen |
| 8,548,618 B1 | 10/2013 | Story, Jr. et al. |
| 8,577,668 B2 | 11/2013 | Rosart et al. |
| 2002/0002459 A1 | 1/2002 | Lewis et al. |
| 2002/0007349 A1 | 1/2002 | Yuen |
| 2002/0041692 A1 | 4/2002 | Seto et al. |
| 2002/0046023 A1 | 4/2002 | Fuji et al. |
| 2002/0116188 A1 | 8/2002 | Amir et al. |
| 2003/0023442 A1 | 1/2003 | Akabane et al. |
| 2003/0061028 A1 | 3/2003 | Dey et al. |
| 2003/0083885 A1 | 5/2003 | Frimpong-Ansah |
| 2003/0115289 A1 | 6/2003 | Chinn et al. |
| 2004/0261093 A1 | 12/2004 | Rebaud et al. |
| 2005/0086211 A1 | 4/2005 | Mayer |
| 2005/0276570 A1 | 12/2005 | Reed et al. |
| 2006/0111909 A1 | 5/2006 | Maes et al. |
| 2006/0148569 A1 | 7/2006 | Beck |
| 2007/0005651 A1 | 1/2007 | Levien et al. |
| 2007/0016314 A1 | 1/2007 | Chan et al. |
| 2007/0061487 A1 | 3/2007 | Moore et al. |
| 2007/0074619 A1 | 4/2007 | Vergo |
| 2007/0118378 A1 | 5/2007 | Skuratovsky |
| 2007/0136459 A1 | 6/2007 | Roche et al. |
| 2007/0276657 A1 | 11/2007 | Gournay et al. |
| 2007/0282607 A1 | 12/2007 | Bond et al. |
| 2008/0114601 A1 | 5/2008 | Boyle et al. |
| 2008/0120312 A1 | 5/2008 | Reed et al. |
| 2008/0141126 A1 | 6/2008 | Johnson et al. |
| 2008/0154593 A1 | 6/2008 | Da Palma et al. |
| 2008/0177822 A1 | 7/2008 | Yoneda |
| 2008/0189099 A1 | 8/2008 | Friedman et al. |
| 2008/0294453 A1 | 11/2008 | Baird-Smith et al. |
| 2009/0006096 A1 | 1/2009 | Li et al. |
| 2009/0006336 A1 | 1/2009 | Forstall et al. |
| 2009/0047003 A1 | 2/2009 | Yamamoto |
| 2009/0062944 A1 | 3/2009 | Wood et al. |
| 2009/0124272 A1 | 5/2009 | White et al. |
| 2009/0136213 A1 | 5/2009 | Calisa et al. |
| 2009/0165634 A1 | 7/2009 | Mahowald |
| 2009/0222520 A1 | 9/2009 | Sloo et al. |
| 2009/0228570 A1 | 9/2009 | Janik et al. |
| 2009/0233705 A1 | 9/2009 | Lemay et al. |
| 2009/0276215 A1 | 11/2009 | Hager |
| 2009/0319273 A1 | 12/2009 | Mitsui et al. |
| 2009/0326948 A1 | 12/2009 | Agarwal et al. |
| 2010/0042682 A1 | 2/2010 | Kaye |
| 2010/0064218 A1 | 3/2010 | Bull et al. |
| 2010/0070575 A1 | 3/2010 | Bergquist et al. |
| 2010/0279822 A1 | 11/2010 | Ford |
| 2010/0286979 A1 | 11/2010 | Zangvil et al. |
| 2010/0287256 A1 | 11/2010 | Neilio |
| 2011/0066438 A1 | 3/2011 | Lindahl et al. |
| 2011/0067082 A1 | 3/2011 | Walker |
| 2011/0067099 A1 | 3/2011 | Barton et al. |
| 2011/0087802 A1 | 4/2011 | Witriol et al. |
| 2011/0099392 A1 | 4/2011 | Conway |
| 2011/0119572 A1 | 5/2011 | Jang et al. |
| 2011/0173214 A1 | 7/2011 | Karim |
| 2011/0177481 A1 | 7/2011 | Haff et al. |
| 2011/0184721 A1 | 7/2011 | Subramanian |
| 2011/0184738 A1 | 7/2011 | Kalisky et al. |
| 2011/0191105 A1 | 8/2011 | Spears |
| 2011/0231474 A1 | 9/2011 | Locker et al. |
| 2011/0246175 A1 | 10/2011 | Yi et al. |
| 2011/0246888 A1 | 10/2011 | Drucker et al. |
| 2011/0248959 A1 | 10/2011 | Diehl |
| 2011/0288861 A1 | 11/2011 | Kurzweil et al. |
| 2011/0288862 A1 | 11/2011 | Todic |
| 2011/0296287 A1 | 12/2011 | Shahraray et al. |
| 2012/0030288 A1 | 2/2012 | Burckart et al. |
| 2012/0054813 A1 | 3/2012 | Carmichael |
| 2012/0109640 A1 | 5/2012 | Anisimovich et al. |
| 2012/0150935 A1 | 6/2012 | Frick et al. |
| 2012/0158706 A1 | 6/2012 | Story, Jr. et al. |
| 2012/0166180 A1 | 6/2012 | Au |
| 2012/0191726 A1 | 7/2012 | Markus et al. |
| 2012/0197998 A1 | 8/2012 | Kessel et al. |
| 2012/0245719 A1 | 9/2012 | Story, Jr. et al. |
| 2012/0245720 A1 | 9/2012 | Story, Jr. et al. |
| 2012/0245721 A1 | 9/2012 | Story, Jr. et al. |
| 2012/0246343 A1 | 9/2012 | Story, Jr. et al. |
| 2012/0310642 A1 | 12/2012 | Cao et al. |
| 2012/0311625 A1 | 12/2012 | Nandi |
| 2012/0315009 A1 | 12/2012 | Evans et al. |
| 2012/0324324 A1 | 12/2012 | Hwang et al. |
| 2013/0041747 A1 | 2/2013 | Anderson et al. |
| 2013/0073449 A1 | 3/2013 | Voynow et al. |
| 2013/0073675 A1 | 3/2013 | Hwang et al. |
| 2013/0074133 A1 | 3/2013 | Hwang et al. |
| 2013/0110513 A1 | 5/2013 | Jhunja et al. |
| 2013/0257871 A1* | 10/2013 | Goldstein et al. ............ 345/440 |
| 2013/0262127 A1 | 10/2013 | Goldstein et al. |
| 2014/0005814 A1 | 1/2014 | Hwang et al. |
| 2014/0039887 A1 | 1/2014 | Dzik et al. |
| 2014/0040713 A1 | 2/2014 | Dzik et al. |
| 2014/0258858 A1 | 9/2014 | Hwang |

FOREIGN PATENT DOCUMENTS

| | | |
|---|---|---|
| NZ | 532174 | 11/2012 |
| SG | 193537 | 10/2013 |
| SG | 193567 | 11/2013 |
| WO | WO 2011/144617 A1 | 11/2011 |
| WO | WO 2011/151500 | 12/2011 |
| WO | WO 2012/129438 | 9/2012 |
| WO | WO 2012/129445 | 9/2012 |
| WO | WO 2013/148724 | 10/2013 |
| WO | WO 2013/169670 | 11/2013 |
| WO | WO 2013/169670 A3 | 11/2013 |
| WO | WO 2013/181158 | 12/2013 |
| WO | WO 2013/192050 | 12/2013 |
| WO | WO 2014/004658 | 1/2014 |

OTHER PUBLICATIONS

Story Jr. et al., U.S. Appl. No. 12/881,021, filed Sep. 13, 2010, entitled "Systems and Methods for Associating Stories with Related Referents".

Zhong et al., "Energy Efficiency of Handheld Computer Interfaces: Limits, Characterization and Practice", MobiSys '05, Proceedings of the 3rd international conference on Mobile Systems, applications, and services, 2005, pp. 247-260.

"Speech Synthesis Markup Language," http://en.wikipedia.org/wiki/Speech_Synthesis_Markup_Language, last modified Feb. 12, 2011, last accessed Mar. 5, 2012.

"Speech Synthesis," http://en.wikipedia.org/wiki/Speech_Synthesis, last modified Feb. 22, 2012, last accessed Mar. 5, 2012.

Roub, Paul, "I'll Buy an E-book Reader When . . . ", Nov. 16, 2007, available at: http://roub.net/blahg/2007/11/16/ill-buy-an-eboo/ (accessed: Sep. 6, 2012), 2 pages.

Enhanced Editions, "Feature: Synched Audio and Text" Aug. 31, 2009, last accessed Nov. 15, 2012, available at http://www.enhanced-editions.com/blog/2009/08/enhanced-editions-features-exclusive-soundtracks-and-extracts/.

Arar, Y., Blio E-Book Platform: No Reader (Yet), But Great Graphics, Jan. 7, 2010.

Beattie, V., et al., Reading Assistant: Technology for Guided Oral Reading, Scientific Learning, Apr. 10, 2012, 5 pages.

Dzik, S.C., U.S. Appl. No. 13/604,482, filed Sep. 5, 2012, entitled Identifying Corresponding Regions of Content.

Dzik, S.C., U.S. Appl. No. 13/604,486, filed Sep. 5, 2012, entitled Selecting Content Portions for Alignment.

(56) References Cited

OTHER PUBLICATIONS

Dzik, S.C., U.S. Appl. No. 13/662,306, filed Oct. 26, 2012, entitled Content Presentation Analysis.

Hwang, D.C., et al., U.S. Appl. No. 13/536,711, filed Jun. 28, 2012, entitled Pacing Content.

International Search Report issued in connection with International Patent Application No. PCT/US12/30198 mailed on Jun. 20, 2012, 16 pages.

Levinson, S.E., et al., Continuous Speech Recognition from a Phonetic Transcription, Acoustics, Speech, and Signal Processing, Apr. 1990, pp. 190-199.

Vignoli, F., et al., A Text-Speech Synchronization Technique With Applications to Talking Heads, Auditory-Visual Speech Processing, ISCA Archive, Aug. 7-10, 1999.

Weber, F.V., U.S. Appl. No. 13/531,376, filed Jun. 22, 2012, entitled Modelling Expected Errors for Discriminative Training.

Goldstein, et al., U.S. Appl. No. 13/434,538, filed Mar. 29, 2012, entitled Content Customization.

Goldstein, et al., U.S. Appl. No. 13/535,260, filed Jun. 27, 2012, entitled Conveying Questions With Content.

Hwang, D., U.S. Appl. No. 13/465,853, filed May 7, 2012, entitled Content Customization.

Hwang, et al., U.S. Appl. No. 13/759,901, filed Feb. 5, 2013, entitled Synchronizing Playback of Digital Content With Physical Content.

International Search Report issued in connection with International Patent Application No. PCTUS12/30186 mailed on Jun. 20, 2012, 12 pages.

International Search Report issued in connection with International Application No. PCT/US13/33935 mailed on Jul. 3, 2013.

International Search Report issued in connection with International Application No. PCT/US13/39757 mailed on Oct. 29, 2013.

International Search Report issued in connection with International Application No. PCT/US13/47866 mailed on Sep. 9, 2013.

International Search Report and Written Opinion in PCT/US2013/042903 mailed Feb. 7, 2014.

International Preliminary Report on Patentability in PCT/US2013/039757 mailed Nov. 11, 2014.

International Search Report issued in connection with International Application No. PCT/US13/53020 mailed on Dec. 16, 2013.

Lester, K.S., U.S. Appl. No. 13/526,343, filed Jun. 18, 2012, entitled Multiple Voices in Audio Content.

Munroe, R., My Hobby: Embedding NP-Complete Problems in Restaurant Orders, Jul. 9, 2007, http://xkcd.com/287.

\* cited by examiner

NARRATION SETTINGS DISTRIBUTION FOR CONTENT CUSTOMIZATION

BACKGROUND

Many forms of digital content contain audio content. For example, electronic books, audiobooks, music, movies, and computer games may all contain audio content. This audio content may include, for example, one or more spoken portions. Typically, this audio content is pre-recorded and cannot be customized by a consumer of the content. Rather, an entirely new recording of the audio content is often necessary to produce customized audio content. It may not be possible to obtain a new recording custom-tailored to a user's listening interests for any number of reasons. For example, the cost of producing a new recording of the audio content may be prohibitive. It might also be difficult, time-consuming, and expensive for the user to customize the audio content exactly to his or her liking: the user might have to oversee the production of the new recording of the audio content, for example.

An example will be illustrative. A user may be interested in purchasing an audiobook that is narrated by a certain narrator. The user may prefer a different narrator's voice for the audiobook. The user may also desire to listen to the audiobook in another language. In the former case, the user might have to pay for a brand new recording of the audiobook done by his or her preferred narrator. In the latter case, the user might have to pay for both a translation of the audiobook and for a new recording of the audiobook in the other language. The user may want to customize other aspects of the narration as well, but may find it impractical to do so.

These problems may be compounded when many users request the customization of content in different ways. For example, one user may desire one set of modifications to an audiobook narration, while a second user desires a second set of modifications to the same audiobook narration. It may not be economically feasible to cater to the tastes of both users because of the costs of recording modified or customized narrations. Of course, these problems and others are not merely limited to audiobook content, but are present in many forms of digital content that include audio content.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Figure 1:
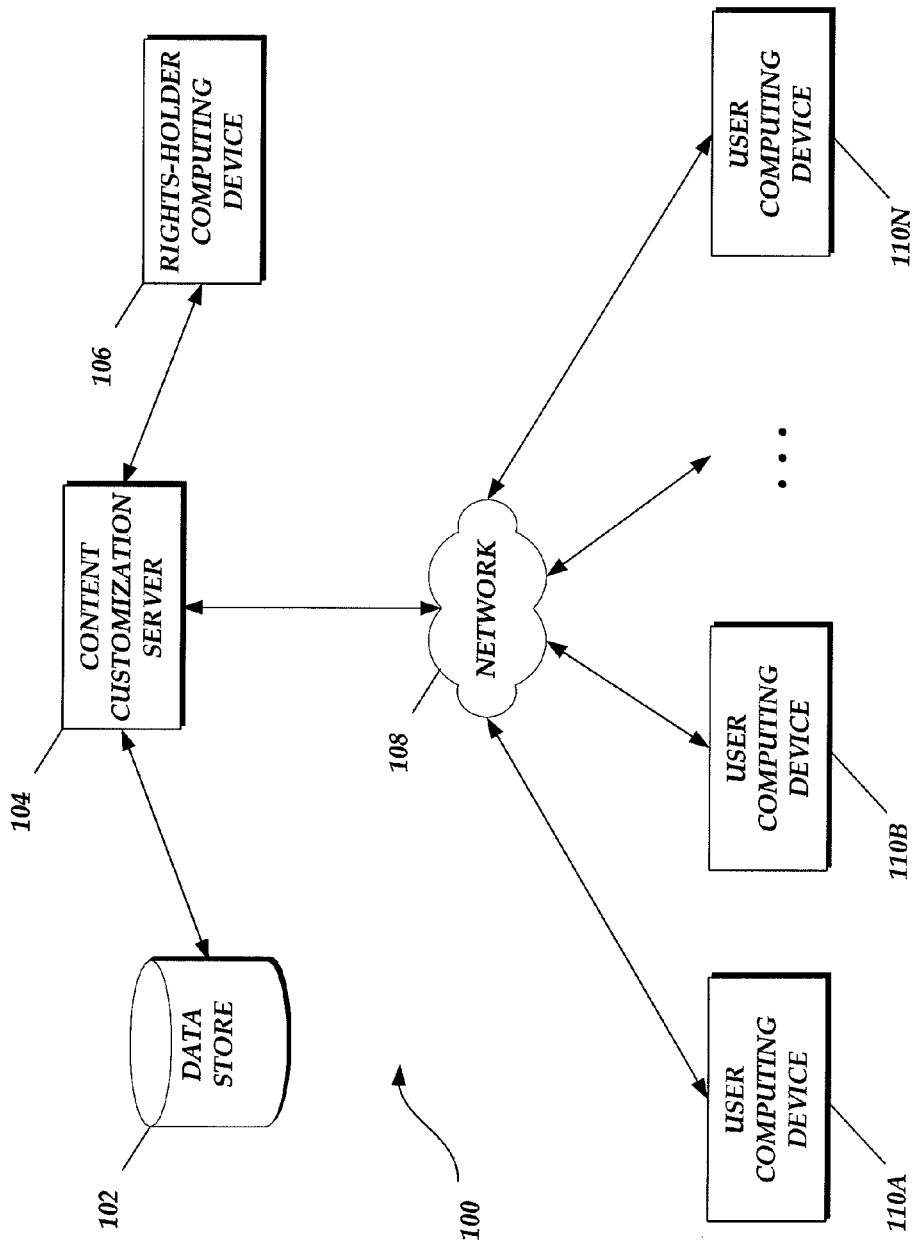
FIG. 1 is a block diagram of an illustrative network environment for modifying a narration associated with an item of content.

Generally described, aspects of the present disclosure relate to the computer-implemented modification and customization of audio narration. The audio narration may be included with an item of content, such as electronic books, audiobooks, music, movies, and computer games, just to name a few. Many aspects of the audio narration, referred to herein as "narration parameters," may be modified to provide a customized listening experience. Accordingly, a person wishing to customize his or her listening experience specifies settings for or changes to one or more narration parameters through a user interface on his or her user computing device. In some embodiments, these settings and changes are made dynamically, e.g., the settings or modifications are made while the audio narration to be customized is being played. These settings and changes may be stored as narration settings information, which may then be shared over a network with other computing devices if desired.

Those skilled in the art will recognize that narration may include, for example, words, phrases, or sentences, and that narration may be spoken, sung, shouted, and the like by speakers such as a narrator, commentator, or character. Narration may also include words, phrases, or sentences such as dialogue, asides, or vocalized thoughts spoken by characters in an item of content.

Narration parameters may include various quantitative aspects of the narration, such as the pitch, treble, bass, contrast, and pace of a speaker's voice. Narration parameters may also include various qualitative aspects of the narration, such as the accent of the speaker; the language or dialect of the speaker; the mood of the speaker; the gender of the speaker; the prosody of the speaker, and so forth.

In some embodiments, a user generates settings for one or more narration parameters of an audio narration using his or her user computing device. One or more user interfaces may be provided for generating these settings. The user interfaces may include elements that enable the user to set or change various parameters of the audio narration. In one embodiment, sliders are used to set or change quantitative narration parameters, such as pitch, pace, contrast, and the like, while drop-down menus are used to set or change qualitative narration parameters, such as mood, accent, language, and the like. Other user interface elements, such as software knobs, dials, mixers, sound boards, checkboxes, radio buttons, and the like may be incorporated into the user interface as well.

The one or more user interfaces may enable the user to specify different narration parameters for different portions of a narration as well. For example, an audiobook may be broken down into portions corresponding to chapters. One set of narration parameters may be used for Chapter 1, a second set of narration parameters for Chapter 2, a third set of narration parameters for Chapter 3, and so on. The narration may be broken down in other ways as well, such as by time increments or by character dialogue.

The narration parameters specified through the user interfaces described herein may be implemented to modify the narration by a computing device. The content customization service may cause the user computing device to display a user interface and prompt the user to specify or set one or more narration parameters through the user interface.

In one embodiment, these user interfaces may be displayed as part of a content page (such as a "Web site"). In another embodiment, a mobile computing application (such as an "app") displays these user interfaces on a user computing device, and causes the user input received by the user computing device to be transmitted over a network to a content customization server. The content customization server may receive the user input over the network, modify the narration, and transmit part or all of the modified narration over a network to the user computing device. In other embodiments, the content customization service is executed entirely by a single user computing device, rather than by a content customization server. Accordingly, user interfaces may be generated and displayed to a user by software or hardware on the user computing device. The user computing device may modify the narration according to the user input and play the modified narration.

In some embodiments, narration settings information is generated for use with one or more narrations or for use on one or more computing devices. In one embodiment, narration settings information is stored as a narration settings file. A narration settings file may be generated by a user computing device, a rights-holder computing device, a content customization server, or any combination thereof. A narration settings file may include specifications for one or more narration parameters of one or more portions of narration. These specifications may be made through a user interface as described above. The same settings for narration parameters may be used for the entire narration, or different portions of the narration may have different settings for each narration parameter. A narration settings file may optionally be subjected to human analysis to determine how accurately it captures a mood, language, or accent. Additionally, narration settings files may be recommended to users of the content customization service based on, for example, who uploaded or downloaded the narration settings file, what genre of content the narration settings file might complement, and the popularity of the narration settings file, just to name a few examples. More than one computing device may be involved in the creation of narration settings information. For example, multiple users may interact with their respective user computing devices to edit a single narration settings file stored on a content customization server or even on another user computing device. Individual parameters of a single narration settings file may be modified by different users. Likewise, narration settings for individual portions of a narration may also be modified by different users.

In some embodiments, the content customization service customizes a narration in accordance with a narration settings file. The content customization service may then transmit part or all of the narration customized according to the narration settings file to the user computing device. In one embodiment, the user computing device transmits a narration settings file to a content customization server, along with a request to customize a narration according to the narration settings file. In another embodiment, the user computing device transmits to the content customization server only a request for a narration to be customized according to a narration settings file stored in a data store. The content customization server may select a narration settings file from the data store, customize the narration according to the narration settings file, and then transmit the modified narration to the user computing device. In embodiments of the content customization service in which the user computing device modifies the narration, the user computing device may acquire a narration settings file from a content customization server associated with the content customization service as described above. The user computing device may then modify the narration itself according to the narration parameters specified by the narration settings file.

In still other embodiments, the narration settings file is stored on the user computing device, and the user computing device uses the narration settings file to generate the modified narration by itself.

In some embodiments, a narration settings file is associated with a narration for a specific item of content. For example, a narration settings file that specifies different narration settings for different portions of the narration for a specific item of content may only be used with that specific item of content, and not with other items of content. In other embodiments, a narration settings file may be used with many different narrations or many different items of content. For example, a particular narration settings file might only specify a user's language and accent preferences without reference to any particular item of content. In another example, such a narration settings file might include particular settings for the quantitative narration parameters. For example, a user may prefer that narration proceed at a particular pace without reference to any particular item of content.

Those skilled in the art will recognize that a narration settings file need not be of any particular file type. In some embodiments, narration settings files are have a particular file type for use with the content customization service that may only be interpreted and edited through the content customization service. In other embodiments, narration settings files may be interpreted and edited in many different environments, e.g., by many different software applications. For example, a narration settings file may be of a file type that may be opened and edited by many different software applications, such as an ASCII text file, a standard text (.txt) file, a Rich Text File (RTF), an Extensible Markup Language (XML) file, or other file type.

Additionally, those skilled in the art will recognize that narration settings information may be represented not just as narration settings files, but as any form of digital information suitable for specifying settings for narration parameters. In one embodiment, narration settings information is represented as computer-executable code that, when run, modifies a narration according to parameters specified in the computer-executable code. In another embodiment, narration settings information is represented as a content page hosted on a network. A user may access the content page through a user computing device. When the user accesses the content page, the content page may direct the user computing device to change one or more narration parameters. Still other forms of storing and applying narration settings information are possible. Generally, the operations that may be performed by the content customization service with or upon narration settings files may be performed with or upon all forms of narration settings information.

Additionally, in some embodiments, visual indicators may be selected and displayed on the user computing device as a complement to the audio narration. Visual indicators may be selected based on, for example, contextual analysis of the narration or item of content; a label associated with the narration or item of content; or by user input. In some embodiments, a label may be a term or keyword assigned to an item or other a piece of information (such as a digital image, bookmark, image, portion of text, item of interest, etc.). A label may help describe an item and allow it to be found again by browsing or searching. Labels may also be referred to as tags.

Turning to FIG. 1, an illustrative network environment 100 is shown. The network environment 100 may include a data store 102, a content customization server 104, a rights-holder computing device 106, a network 108, and any number of user computing devices 110A, 110B, 110N, and so forth. The constituents of the network environment 100 may be in communication with each other either locally or over the network 108.

The data store 102 may store one or more audio files associated with one or more items of content. For example, an audio file may include an audiobook that includes a narration. Multiple narrations of the same item of content may be stored in the data store 102, for example, an English narration, a French narration, and a Spanish narration of the same item of content, or multiple versions in the same language spoken in different accents. The data store 102 may also store narration settings information, such as narration settings files, that may be used to customize the narration of an item of content. Narration settings files may specify settings for the various narration parameters for one or portions of a narration associated with one or more item of content. Narration settings files may also be organized, cataloged, categorized, etc. as desired. For example, the narration settings files in the data store 102 may categorized by the user that generated the narration settings file; a genre of narration for which the narration settings file might be desirable; or a particular item or items for which the narration settings file might be desirable. Other categories are possible and within the scope of the present disclosure. Narration settings information in the form of executables or content pages may be similarly organized as desired.

In some embodiments, the data store 102 also stores one or more narrator voice libraries. Narrator voice libraries may include audio files including one or more clips spoken by one or more narrators or characters in an item of original content. An audio clip may include, for example, individual phonemes or syllables, words, phrases, or sentences. In some embodiments, a set of audio clips spoken by a narrator or character may include enough audio clips that a speech synthesis program run by the content customization service can construct any desired syllable, word, phrase, sentence, etc. in the narrator's or character's voice. Such speech synthesis programs, such as programs for concatenative speech synthesis or formant speech synthesis, are known in the art and will not be described in further detail here.

The data store 102 may also store data used to dynamically generate new narration. For example, the data store 102 may store one or more textual transcripts of a narration, such as narration scripts. The data store 102 may also store an item of content in textual form, such as an electronic book. The data store 102 may also store rules for generating new narration, for example, narration modified to have an accent. An example rule pertaining to accents might be "replace all 'ar' phonemes in the narration with 'ah' phonemes" for a Boston accent, such that "car" in the narration becomes "cah."

The data store 102 may be embodied in hard disk drives, solid state memories, and/or any other type of non-transitory computer-readable media. The data store 102 may be distributed or partitioned across multiple storage devices as is known in the art without departing from the spirit and scope of the present disclosure. Moreover, while the data store 102 is depicted in FIG. 1 as being local to the content customization server 104, those skilled in the art will appreciate that the data store 102 may be remote to the content customization server 104.

The content customization service may be embodied in a number of electronic environments. In some embodiments, the content customization service is embodied in a content customization server 104 accessed by one or more user computing devices 110A-110N over the network 108. In still other embodiments, the content customization service is embodied in its entirety in a user computing device 110A-110N.

The content customization server 104 may be able to transmit data to and receive data from the user computing devices 110A-110N. For example, the content customization server 104 may be able to receive requests for modified narration and/or narration settings information from one or more user computing devices 110A-110N. The content customization server 104 may also perform requested modifications to generate modified narrations. The content customization server 104 may also be able to transmit narration settings information, items of content, original narrations, and modified narrations to one or more user computing devices 110A-110N.

The rights-holder computing device 106 and each user computing device 110A-110N may be any computing device capable of communicating over the network 108, such as a laptop or tablet computer, personal computer, personal digital assistant (PDA), hybrid PDA/mobile phone, mobile phone, electronic book reader, set-top box, camera, audiobook player, digital media player, video game console, in-store kiosk, television, one or more processors, integrated components for inclusion in computing devices, appliances, electronic devices for inclusion in vehicles or machinery, gaming devices, or the like. The rights-holder computing device 106 and each user computing device 110A-110N may be operative to generate or display user interfaces for customizing narration according to user input. These computing devices may then store the narration settings information (e.g., as a user-generated narration settings file or as a rights-holder-generated narration settings file) and transmit it over the network 108.

The content customization server 104, rights-holder computing device 106, and user computing devices 110A-110N may each be embodied across a plurality of computing devices, each executing an instance of the respective content customization server 104, rights-holder computing device 106, and user computing devices 110A-110N. A server or other computing system implementing the content customization server 104, rights-holder computing device 106, and user computing devices 110A-110N may include a network interface, memory, processing unit, and non-transitory computer-readable medium drive, all of which may communicate with each other by way of a communication bus. Moreover, a processing unit may itself be referred to as a computing device. The network interface may provide connectivity over the network 108 and/or other networks or computer systems. The processing unit may communicate to and from memory containing program instructions that the processing unit executes in order to operate the content customization server 104, rights-holder computing device 106, and user computing devices 110A-110N. The memory generally includes RAM, ROM, and/or other persistent and/or auxiliary non-transitory computer-readable media.

Those skilled in the art will appreciate that the network 108 may be any wired network, wireless network or combination thereof. In addition, the network 108 may be a personal area network, local area network, wide area network, cable network, satellite network, cellular telephone network, or combination thereof. Protocols and components for communicating via the Internet or any of the other aforementioned types of communication networks are well known to those skilled in the art of computer communications and thus, need not be described in more detail herein.

It will be recognized that many of the devices described above are optional and that embodiments of the environment 100 may or may not combine devices. Furthermore, components need not be distinct or discrete. Devices may also be reorganized in the environment 100. For example, the content customization server 104 may be represented in a single physical server or, alternatively, may be split into multiple physical servers. The entire content customization service may be represented in a single user computing device 110A, 110B, 110N, etc. as well.

Figure 2:
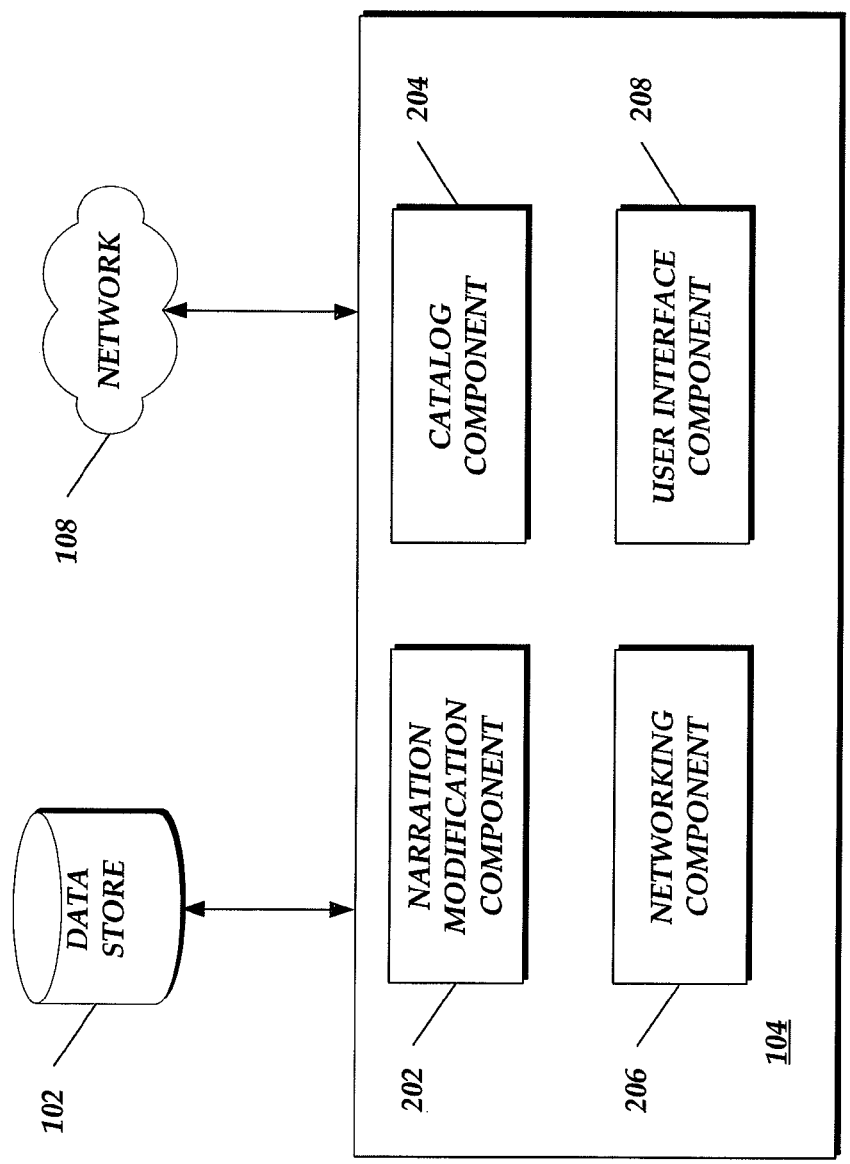
FIG. 2 is a schematic diagram of an illustrative server that may implement the content customization service.

FIG. 2 is a schematic diagram of an example content customization server 104. The content customization server 104 may include a narration modification component 202, a networking component 204, a catalog component 206, and a user interface component 208. These components may be in communication with each other. The content customization server 104 may be connected to a data store 102 and may be able to communicate over a network 108. Other elements of the network environment shown in FIG. 1 have been omitted in this figure so as not to obscure the content customization server 104. However, the content customization server 104 may also be able to communicate with a rights-holder computing device 106 and one or more user computing devices 110A-110N as shown in FIG. 1, either locally or through electronic network 108.

The narration modification component 202 may operate to generate modified narration. In one embodiment, the narration modification component 202 retrieves a narration and a narration settings file from the data store 102. In another embodiment, the narration modification component retrieves a narration from the data store 102 and receives narration settings dynamically from a user computing device receiving user input. The narration modification component 202 then applies the settings specified by the narration settings file or by the user input to the narration. The modified narration may then be transmitted over the network 108 to the user computing device. In embodiments where a modified narration is transmitted over the network 108, the modified narration may be transmitted to the user computing device in its entirety, in one or more portions, or in a continuous stream, as is known in the art.

Narrations may be modified in different ways depending on the narration parameters to be changed. Specific modifications to narration parameters and example processes for carrying out those modifications are discussed below with respect to FIG. 6. Those skilled in the art will appreciate that these processes may be carried out by the content customization server 104 or a user computing device, or by both. For example, the content customization server 104 may modify one portion of the narration and stream the modified narration to the user computing device, while the user computing device modifies a second portion of the narration stored on the user computing device.

The catalog component 204 may operate to identify and mark various characteristics of narration settings files. These characteristics may include, for example, the user that generated the narration settings file; a genre of narration for which the narration settings file might be desirable; or a particular item or items for which the narration settings file might be desirable. The catalog component 204 may store the characteristics of each narration settings file to facilitate the future retrieval of narration settings files from the data store 102 or to help users select a narration settings file to be obtained from the content customization service. For example, the catalog component 204 may identify that a particular narration settings file is associated with an item of content in a series. If a user of a user computing device downloads a narration settings file for one item of content in the series, the catalog component 204 may direct the content customization server 104 to transmit a recommendation over the network 108 to the user computing device suggesting that the user download a second narration settings file for another item of content in the series. Other recommendations are possible. For example, the user may have on his or her user computing device an item of content by a particular author who holds rights to the item of content. The author may have generated a narration settings file for use with the narration to the item of content. The catalog component 204 may direct the content customization server 104 to transmit a recommendation over the network 108 to the user computing device suggesting that the user download the narration settings file generated by the author. Other forms of narration settings information, such as executables or content pages, may be similarly catalogued as desired.

The catalog component 204 may also operate to label a narration associated with an item of content. Labels may incorporated into a narration or an item of content on which the narration is based to help the content customization service select narration parameters by machine or to assist a user in selecting narration parameters. Labels may correspond to a portion of the narration and may suggest a mood for the narration as well as other narration parameters, such as pitch, treble, bass, etc.

In one embodiment, the content customization service may synchronize a narration with a textual item of content with which it is affiliated, generate labels based on a contextual analysis of the textual item of content, and then apply narration parameters suggested by those labels to the narration. U.S. patent application Ser. No. 13/070,313, filed Mar. 23, 2011, and entitled "SYNCHRONIZING DIGITAL CONTENT," the disclosure of which is hereby incorporated by reference in its entirety, describes a number of ways by which narration and an item of textual content may be synchronized. For example, part of the textual item of the content may state, "Steve and I inhaled helium." The content customization service might attach a label named "helium" to a portion of the narration that occurs immediately after the words "inhaled helium." The pitch of the portion of the narration that occurs immediately after the words "inhaled helium" may be increased in response to the label, since helium causes a person who inhales it to speak in a high-pitched voice. In other embodiments, labels for portions of the narration may be obtained by the content customization server 104 from a network resource accessed over the network 108. For example, the catalog component 204 may determine moods for each chapter of a narration by performing contextual analysis on a summary of each chapter of an item of textual content associated with the narration. The summary may be hosted by a network-based encyclopedia or knowledge base, for example.

The networking component 206 may operate to interact with one or more user computing devices over the network 108. For example, the networking component 206 may receive a request from a user computing device for narration settings information, such as a narration settings file. This request may be relayed to the catalog component 204, which may then select or recommend narration settings information from the data store 102 to be transmitted to the user computing device. The networking component 206 may then cause the content customization server 104 to transmit the selected narration settings information to the user computing device over the network 108.

The networking component 206 may also transmit narration settings information or a modified narration to a user computing device over the network 108. In embodiments where a modified narration is transmitted over the network 108, the modified narration may be transmitted to a user computing device in its entirety, in one or more portions, or in a continuous stream, as is known in the art. For example, as the narration modification component 202 completes its modifications to a portion of the narration, the modified narration portion may be transmitted to the user computing device.

The networking component 206 may also be able to analyze relationships between multiple individuals and/or their user computing devices that interact with the content customization server 104. For example, a first user of a first user computing device may upload a narration settings file to the content customization server 104. The catalog component 204 identifies the uploaded narration settings file as having been generated by a first user of the first user computing device. The networking component 206 may then access, over the network 108, a social graph associated with the first user that is maintained by a social networking service. The networking component 206 may identify in the social graph several individuals in the first user. For example, the networking component 206 may identify that a second user of a second user computing device is related to or associated with the first user in the social graph (e.g., as "friends" or "contacts," or as members of the same "group" or "circle"). Accordingly, the networking component 206 may direct the content customization server 104 to transmit, over the network 108, a recommendation to the user of the second computing device to download the narrations setting file generated by the first user. In another example, the networking component 206 may direct the content customization server 104 to transmit a recommendation to a second user computing device suggesting that a second user download a narration settings file that was previously downloaded by a first user related in a social graph to the second user. Other recommendations based on other aspect of social graphs are possible: for example, recommendations based on "friends in common" (e.g., individuals that appear in multiple users' social graphs) or on common group memberships.

The networking component 206 may also include decision logic for selecting a computing device to carry out the modifications to the narration. For example, some user computing devices may be ill-suited to carry out modifications to the narration. A narration modification may require a significant amount of energy (e.g., electrical energy stored in a battery) for a user computing device to carry out, for example. If the user computing device's energy reserve is below the energy needed to process the modifications, the modification may be made on the content customization server 104, which may be plugged in (and thus have a functionally unlimited energy reserve). A user computing device may also have a relatively slow processor, such that narration modifications take an unacceptably long time for the user computing device to execute. It may be advantageous to have the content customization server 104 modify the narration and transmit the modified narration to the user computing device. It may be especially advantageous to offload more computationally demanding narration modifications, such as those involving large portions of narration or those that may require speech-to-text or text-to-speech conversions (e.g., changes to the language or accent of the narration).

The networking component 206 may also communicate with one or more user computing devices over the network 108 to determine which user computing devices are associated with which items of content. For example, a user may have a particular audiobook stored on his or her user computing device. Accordingly, the networking component 206 may identify the audiobook stored on the user computing device, direct the content customization server 104 to retrieve narration settings information associated with the audiobook (as determined by the catalog component 204), and transmit the narration settings information over the network 108 to the user computing device.

The networking component 206 may also automatically direct the transmission of narration settings information to a user computing device based on information about the user's narration preferences. For example, the content customization service may determine that a user whose user computing device is associated with a particular item of content, such as an audiobook, has previously generated similar narration settings for many different narrations. For example, the user may have previously indicated that he or she prefers narrations to be spoken at a slow pace and with a Southern accent. The networking component 206 may identify the narration settings that the user has previously used, and direct the content customization server 104 to retrieve a narration settings file that is customized for the audiobook and that matches the user's previously generated narration settings, The user interface component 208 may operate to generate one or more user interfaces for use with the content customization service. These user interfaces may be generated, for example, on a content page (or "Web page") hosted on the network 108 by an embodiment of the content customization service. A user may use his or her computing device to access the content page over the network 108 to interact with one or more user interfaces generated by the user interface component 208. These interactions may include the user specifying settings for one or more narration parameters for a narration, the user requesting narration settings information (such as a narration settings file) for a narration, or the user requesting that the content customization server 104 generate a modified narration to be transmitted to the user computing device. Example user interfaces and their operations are discussed further with respect to FIG. 6, FIG. 7, and FIG. 8.

Those skilled in the art will recognize that the content customization service may be embodied in a single user computing device, as discussed above. Accordingly, a user computing device may include some or all of the components that may be included in the example content customization server 104. For example, a user computing device may include a narration modification component 202 and a user interface component 208 so that the user computing device can obtain changes or settings from a user. The user computing device may also include the decision logic used by the networking component 206 to determine which device executes narration modifications. For example, the user computing device may receive requests for modification through a user interface and then execute those modifications if, for example, a network connection to the content customization server 104 is unavailable. The user computing device may also execute modifications for large portions of narration if the user computing device is on a limited data plan with a network service provider, such that streaming a large portion of the modified narration might be expensive for the user.

Figure 3A:
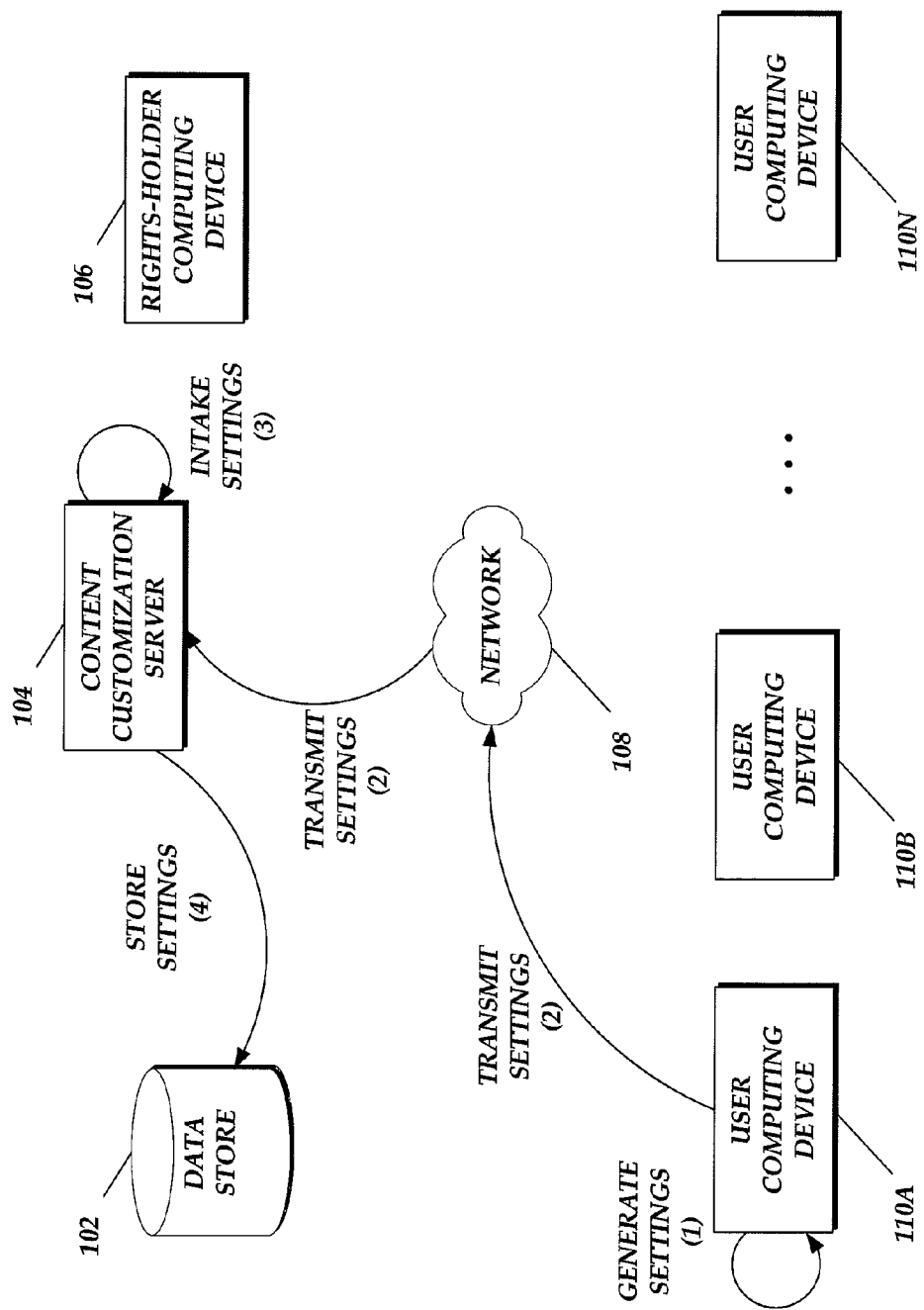
FIG. 3A is a state diagram depicting an illustrative routine for generating settings for narration and submitting them to a content customization server.

FIG. 3A depicts an illustrative state diagram by which settings may be generated by a user computing device 110A and stored for use by the content customization service. The user may use his or her user computing device 110A to generate narration settings information, such as a narration settings file, that specifies or sets one or more narration parameters for one or more portions of the narration. The content customization service may provide one or more user interfaces on the user computing device 110A to facilitate the generation of the narration settings file. Having generated the narration settings file, the user may then submit the file over the network 108 to the content customization server 104. The content customization server 104 may then intake those settings. During the intake routine, the content customization server 104 may catalog, categorize, or otherwise classify the narration settings file generated. For example, the content customization server 104 might associate the narration settings file with the user that generated the narration settings file; the item of content for which the user generated the narration settings file; the genre of the item of content for which the user generated the narration settings file, etc. Having performed the intake routine on the narration settings file, the content customization server 104 may then store the narration settings file to the data store 102 for future retrieval and transmission to, for example, user computing devices 110B-110N. This intake routine may also be performed on narration settings information in the form of executables or content pages.

Figure 3B:
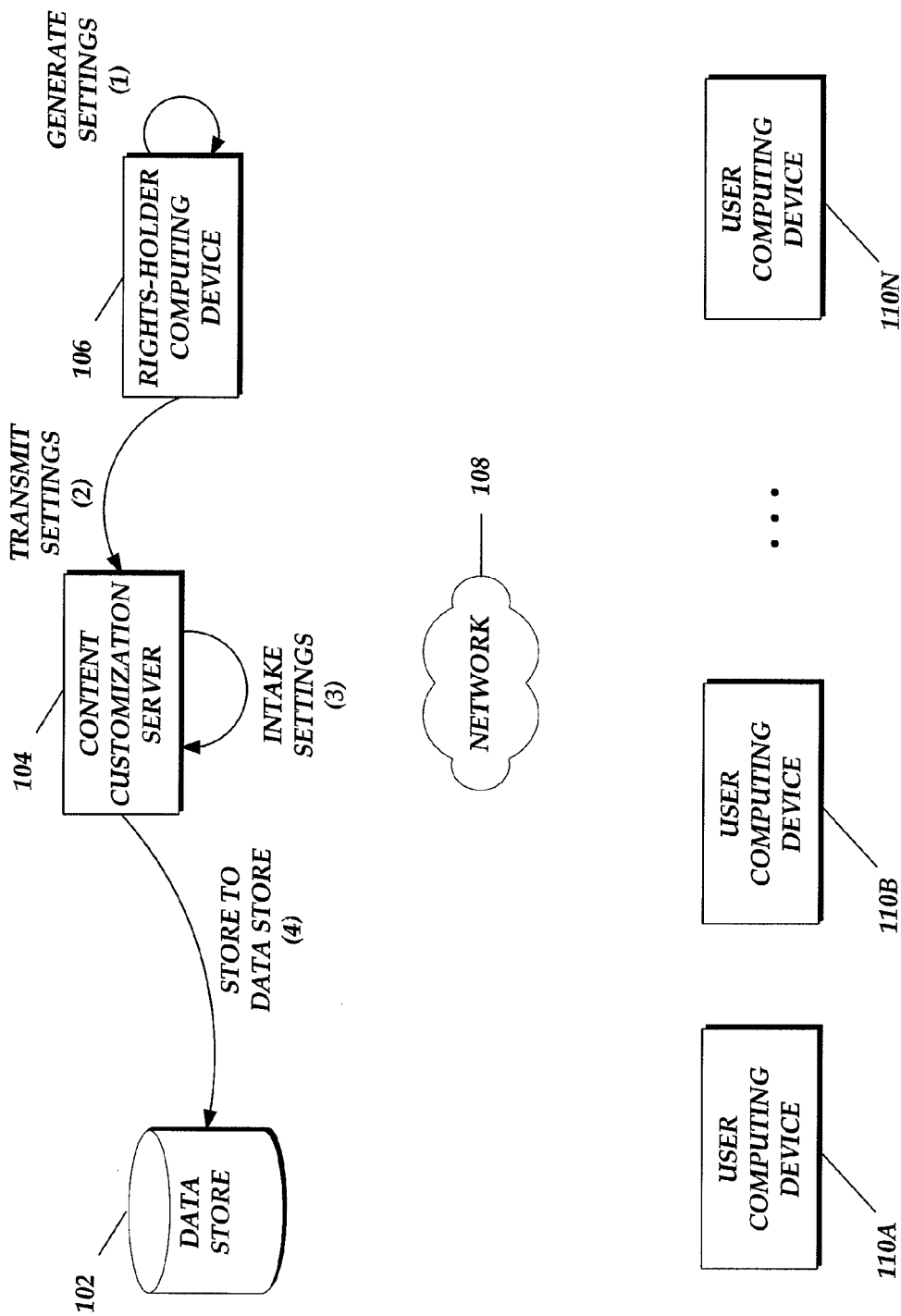
FIG. 3B is a state diagram depicting an illustrative routine for generating settings for narration and submitting them to a content customization server.

FIG. 3B depicts an illustrative state diagram by which settings may be generated by a rights-holder computing device 106 and stored for use by the content customization server 104. A rights-holder may be any individual, group, or business entity that holds intellectual property rights (e.g., trademarks, copyrights, rights of publicity, or moral rights) in the item of content or the original narration. In some embodiments, the rights-holder is a publisher of the item of content. In other embodiments, the rights-holder is a narrator of the original narration. In still further embodiments, the rights-holder is the author of the item of content. A rights-holder may also be the assignee or licensee of rights from a publisher, author, narrator, etc.

The rights-holder may use a rights-holder computing device 106 to generate narration settings information, such as a narration settings file, that specifies or sets one or more narration parameters for one or more portions of the narration. While narration settings files are discussed below, the same routine may be followed to generate executable narration settings information or narration settings information in the form of a content page. The content customization service may provide one or more user interfaces on the rights-holder computing device 106 to facilitate the generation of the narration settings information. These user interfaces may be similar to those provided by the content customization service on user computing devices 110A-110N.

The content customization service may also permit a user of the rights-holder computing device 106 to lock one or more portions of the narration associated in which the rights-holder has rights. For example, the author of an item of content may wish to perform a narration for the item of content and then generate a narration settings file for his or her narration in which all of the narration parameters for the entire narration are locked. In this way, the rights holder may choose to prevent anyone from making any modifications to the narration parameters of his or her narration.

Alternately, the rights-holder may choose to lock only a portion of the narration or only certain narration parameters. For example, the author of an item of content may perform a narration of his or her item of content. The author may wish to allow users to listen to his or her narration of the item of content in many languages, but may not wish to allow any other changes. Accordingly, the author may generate a narration settings file specifically for his or her narration of his or her item of content in which all of the narration parameters are locked except for the language parameter.

Having generated the narration settings file, the rights-holder may then submit the file over the network 108 to the content customization server 104. The content customization server 104 may then intake those settings as described above, associating the narration settings file with the rights-holder; with an item of content or narration in which the rights-holder has rights; and so forth. Having performed the intake routine on the narration settings file, the content customization server 104 may then store the narration settings file to the data store 102 for future retrieval and use.

Figure 3C:
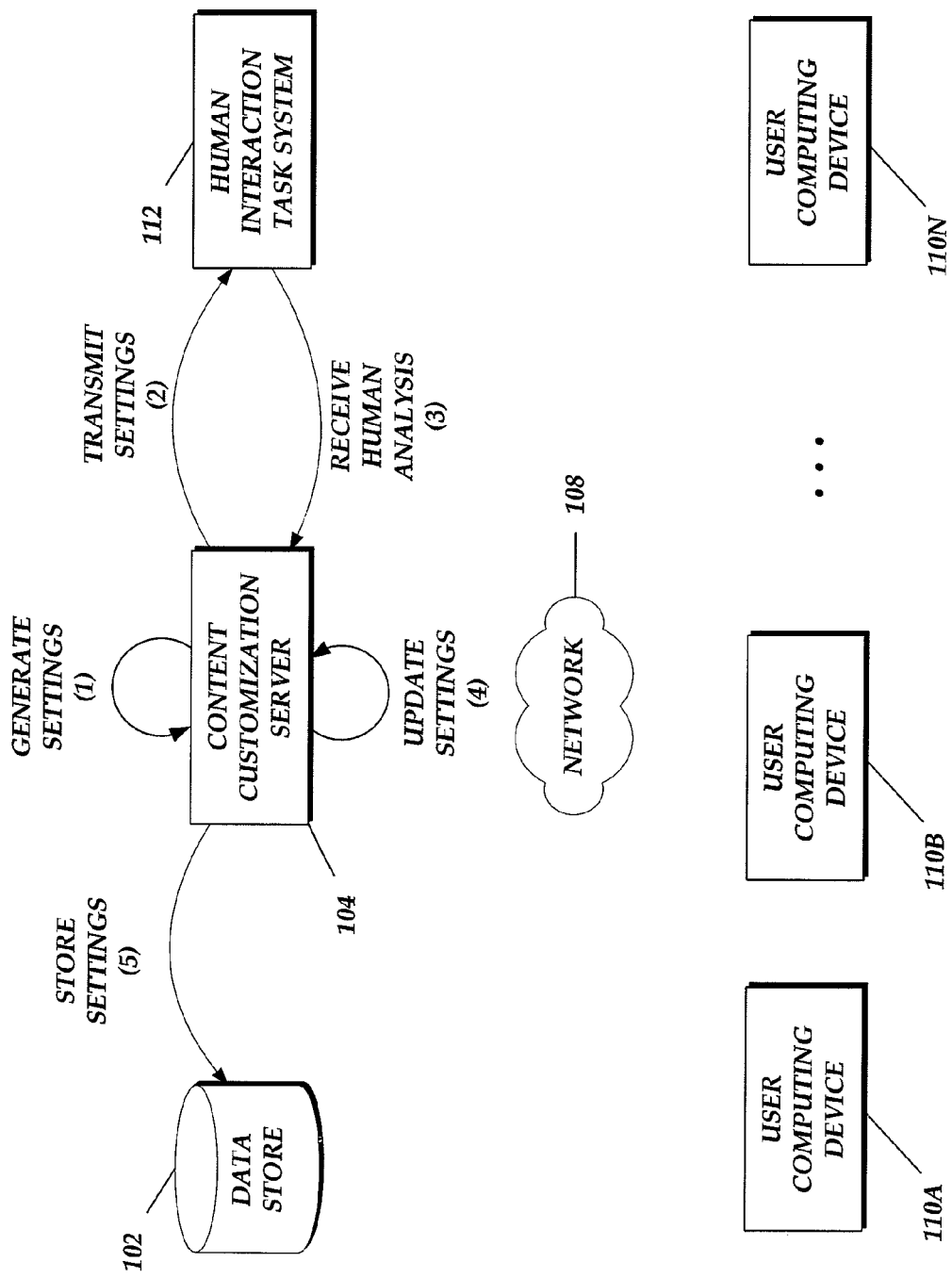
FIG. 3C is a state diagram depicting an illustrative routine for generating settings for narration and submitting them to a human interaction task system.

In addition to using user-generated and rights-holder-generated narration settings files, the content customization service may also automatically generate a narration settings file for one or more items of content. FIG. 3C depicts an illustrative state diagram in which the content customization server 104 generates a narration settings file through machine analysis.

In some embodiments, the content customization server 104 produces a narration settings file that can be used with many different narrations and/or many different items of content. For example, the content customization server 104 may generate a narration settings file that could be used with a particular genre of items of content; a narration settings file that could be used with multiple items of content by the same author; a narration settings file that could be used with a particular narrator's voice; and the like. A narration settings file that could be used with a particular narrator's voice could be advantageously used to obviate the need for a narrator to record multiple audiobooks. In other embodiments, a narration settings file is machine-generated for use with a specific audiobook or other item of content that includes narration. For example, the content customization server 104 may assign its own settings to each labeled portion of a specific narration.

The content customization server 104 may also receive input from a human interaction task system 112 in generating the narration settings file. Generally described, the human interaction task system 112 is a computerized system, including one or more computing devices, that electronically processes human/interaction tasks (HITs). A HIT may be a difficult, time-consuming, or expensive task for a computing device to perform. However, it might be relatively easy and quick for a human to perform a HIT. Accordingly, the human interaction task system 112 might request a human worker to perform a HIT, e.g., for gathering information or answering a query, and to return the results or answers to the human interaction task system 112 for further processing and/or presentation to the requestor. A human worker may be well suited to make subjective determinations about how well a set of narration parameters fit with the words spoken by the narrator, the mood of the narration, the mood of the item of content, etc. The human worker may volunteer to answer these and other queries and provide other information to the human interaction task system 112 such that the answers and information may be provided to the content customization server 104.

Figure 6:
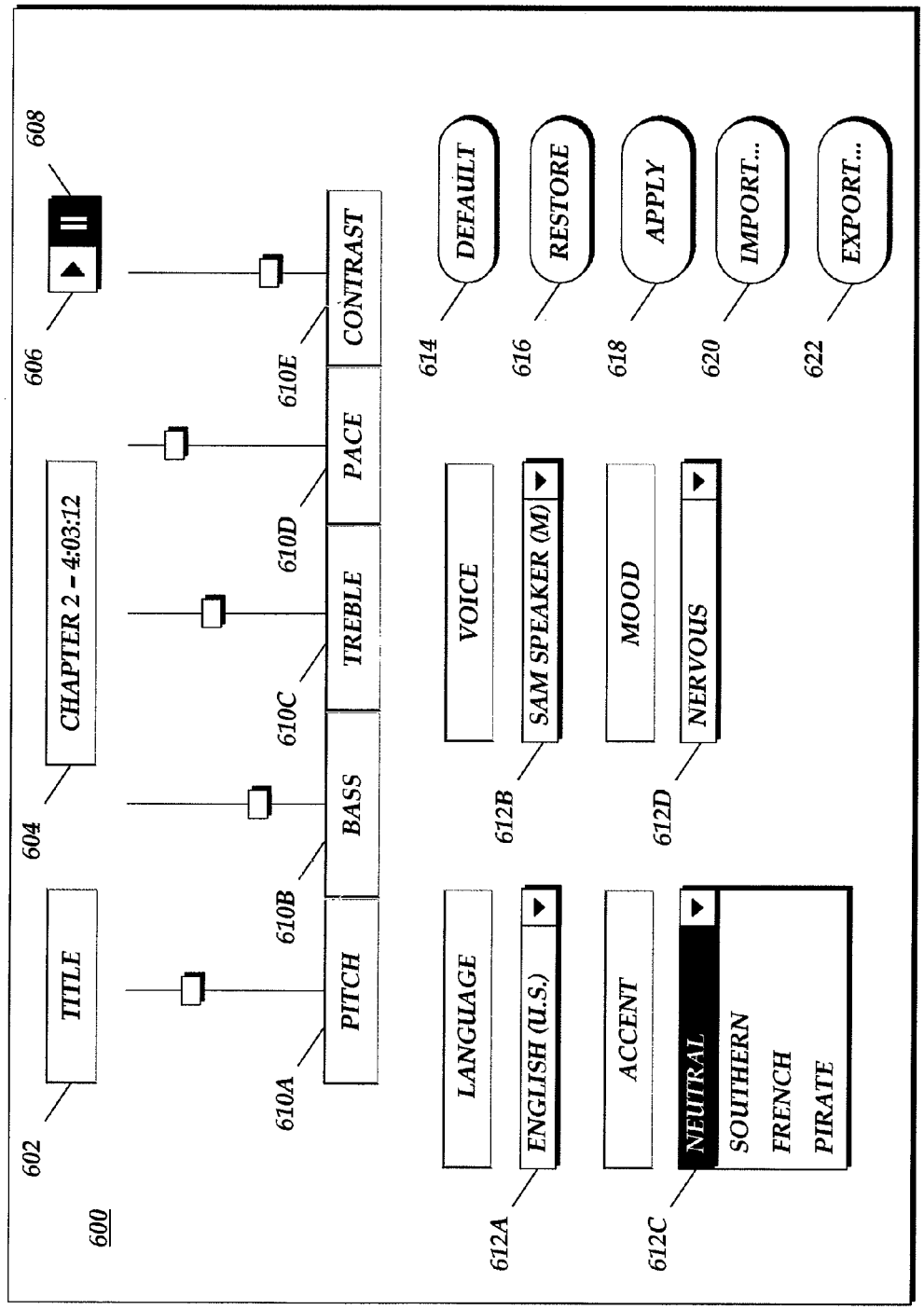
FIG. 6 is a pictorial diagram of an illustrative user interface that may be used to generate narration settings.
Figure 7:
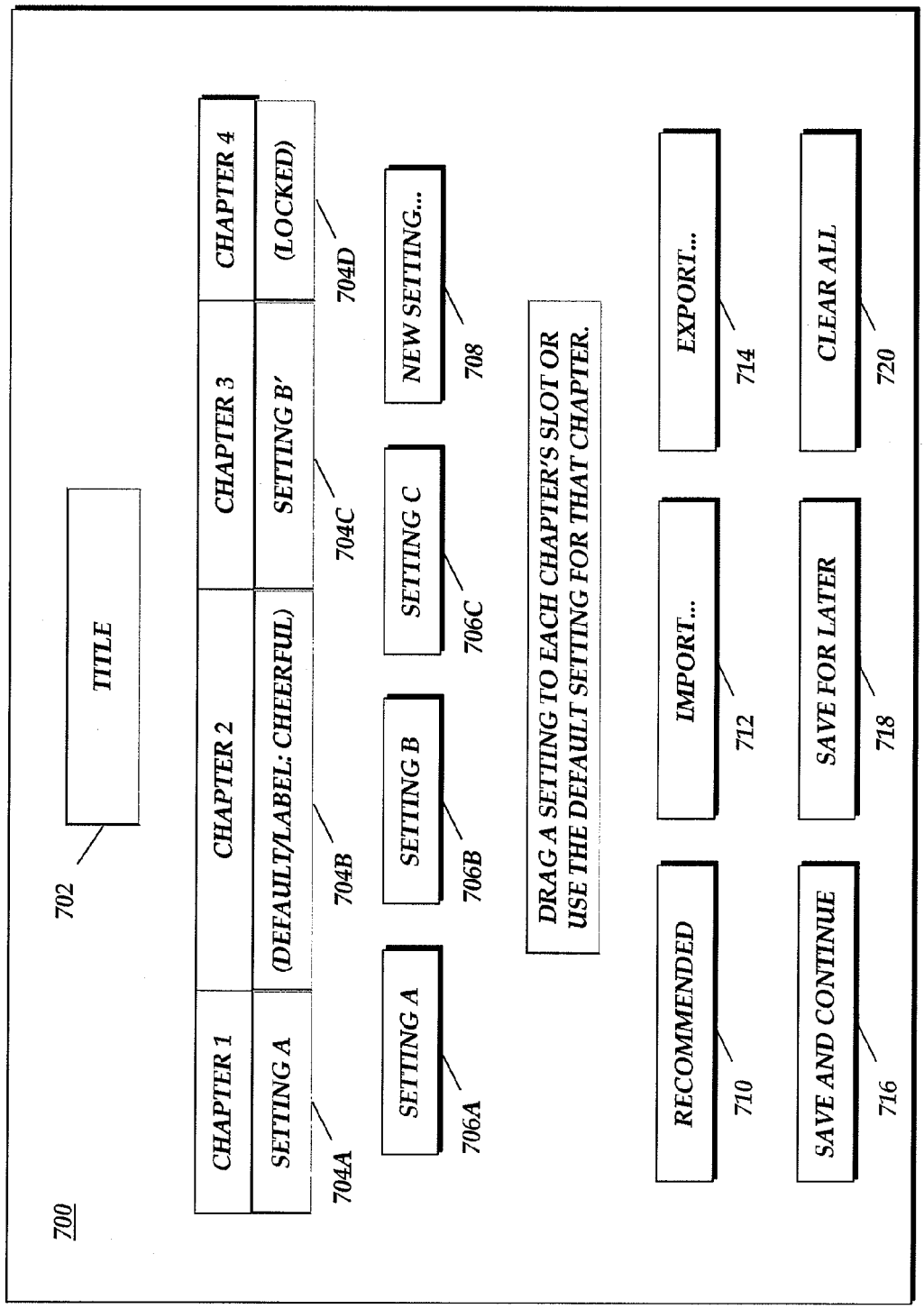
FIG. 7 is a pictorial diagram of an illustrative user interface that may be used to generate narration settings.

HITs may be generated by the content customization server 104 to improve machine modifications of the narration. An example of a HIT might be, "Does this narration capture the mood of the text?" A portion of the narration may then be played. If the human worker indicates that the narration does not capture the mood of the text, the human worker may be prompted to suggest one or more changes to the narration parameters. For example, the content customization server 104 may display one or more user interfaces, such as shown in FIG. 6 and FIG. 7, and request that the human worker change the narration parameters to generate a more appropriate narration settings file.

Figure 4:
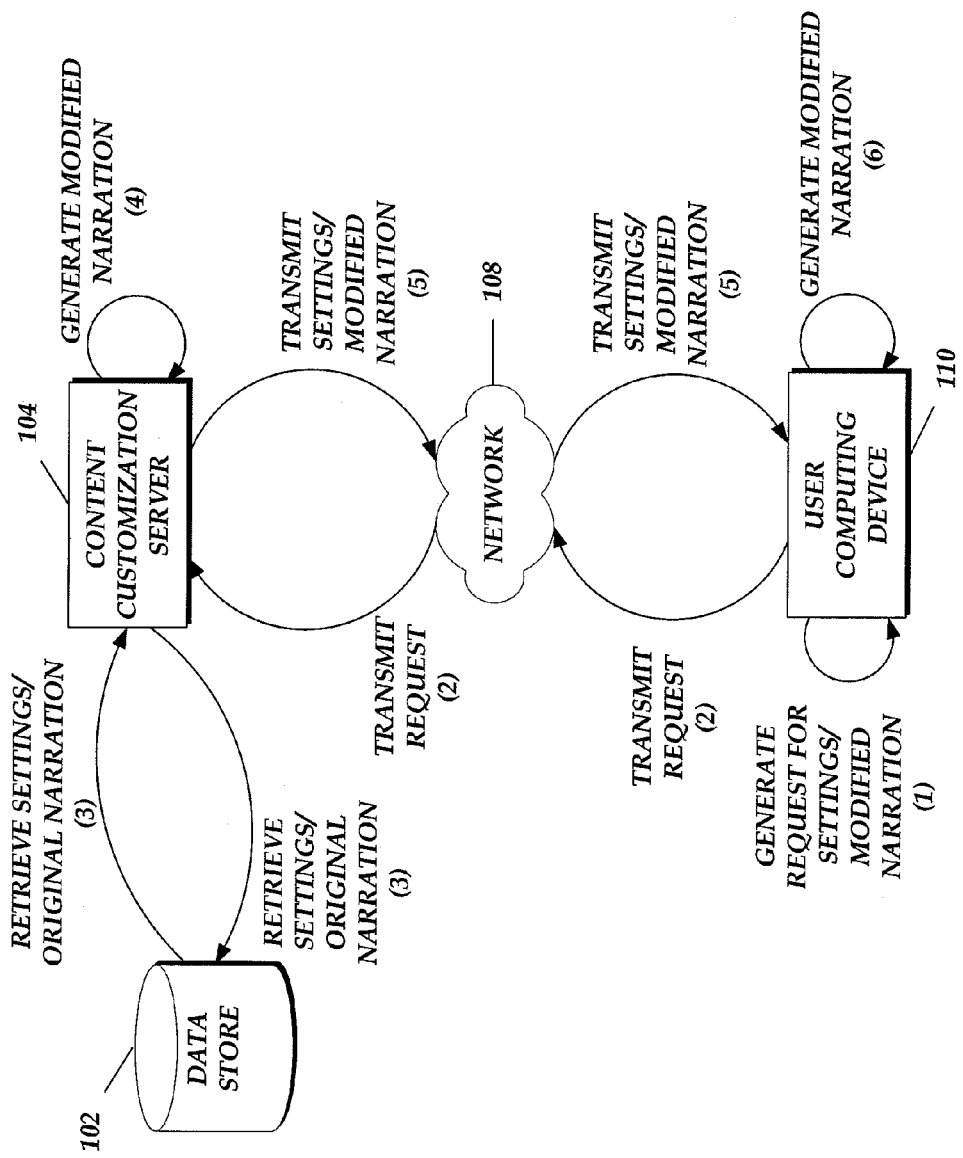
FIG. 4 is a state diagram depicting an illustrative routine for obtaining narration settings and/or modified narration from a content customization server.

FIG. 4 depicts an illustrative state diagram of the content customization service as it performs a narration modification operation. Four example narration modification operations will be described herein with respect to this state diagram. Those skilled in the art will appreciate that other operations are possible. Additionally, while examples pertaining to narration settings files are discussed below, these operations may be used generally with any form of narration settings information.

In a first example operation, the original narration for an item of content is stored on a user computing device 110. A user generates a request for a modified narration or a locally stored narration settings file (1) on the user computing device 110. For example, the user may specify several narration parameters through a user interface displayed on the user computing device 110, or the user may import a narration settings file stored on the user computing device 110. In response, the user computing device may generate modified narration (6) based on the user's input or on the imported narration settings file as applied to the original narration.

In a second example operation, the original narration for an item of content is stored on a user computing device 110. The user generates a request for a narration settings file (1) the user computing device 110, and transmits the request (2) over network 108 to the content customization server 104. The content customization server 104 may, in response to the request, retrieve a narration settings file (3) from data store 102, and transmit the narration settings file (5) over network 108 to the user computing device 110. The user computing device 110 may then use the narration settings file to generate a modified narration (6) from the original narration stored on the user computing device 110.

In a third example operation, a user generates a request for a narration settings file (1) on his or her user computing device 110, and transmits the request (2) over network 108 to the content customization server 104. The content customization server 104 may, in response to the request, retrieve an original narration of an item of content and a narration settings file (3) from data store 102, and apply the narration settings file to the original narration to generate a modified narration (4). The content customization server may then transmit the modified narration (5) to the user computing device 110.

In a fourth example operation, a user generates a request for a modified narration (1) on his or her user computing device 110 by specifying one or more changes to one or more narration parameters of an original narration, wherein the original narration is transmitted from the content customization server 104 to the user computing device 110 for playback. The request may be transmitted (2) over the network 108 to the content customization server 104. The content customization server 104 may, in response to the request, retrieve the original narration (3) from the data store 102 (or from a memory buffer on the content customization server 104) and apply the user's requested changes to generate a modified narration (4). The content customization server may then transmit the modified narration (5) to the user computing device 110 via network 108.

The content customization service may select which narration modification operation (e.g., which computing device carries out which narration modifications) is followed based on a variety of factors, and multiple operations may be followed for different portions of narration. The selection of a computing device to make some or all of the desired modifications to the portion of the narration may be made based a number of factors.

In one embodiment, the content customization service accesses hardware information about one or more computing devices connected over a network 108 (e.g., a user computing device 110 and the content customization server 104) to assess these values and make decisions accordingly. For example, the content customization service may determine that a computing device selected to make a requested narration modification should have a processor speed of at least about 500 MHz, at least about 800 MHz, or at least about 1 GHz, to name a few example thresholds. If the user computing device 110 has a processor speed above the threshold value set by the content customization service, the user computing device 110 may form the modified narration. If not, the content customization server 104 may form the modified narration and transmit the modified narration to the user computing device 110 over the network 108. Other factors may be used to guide the selection of the device as well, such as the availability of a connection over the network 108, the energy reserve (e.g., battery level) of user computing device 110, or the amount of RAM installed in the user computing device 110, to name a few examples.

The selection of a computing device may also be determined by the modifications to the narration to be performed. In one embodiment, the user computing device 110 is selected by the content customization service to make modifications to quantitative narration parameters of a portion of the narration, such as the bass, treble, pitch, pace, or contrast. In another embodiment, the content customization server 104 is selected by the content customization service to make modifications to the qualitative narration parameters of a portion of the narration, such as the language, accent, mood, or speaker. These computing device selections reflect that it may be relatively easy for a user computing device 110 to make and apply changes to quantitative narration parameters, but relatively difficult or impractical to have a user computing device 110 also make and apply changes to qualitative narration parameters. For example, the content customization server 104 may be more suited to generating a modified narration wherein a new speaker is chosen for the narration, as generating a modified narration with a new speaker may involve generating a textual transcript from the original narration, then synthesizing a new narration from the textual transcript using clips of the new speaker's voice stored in data store 102.

Figure 5:
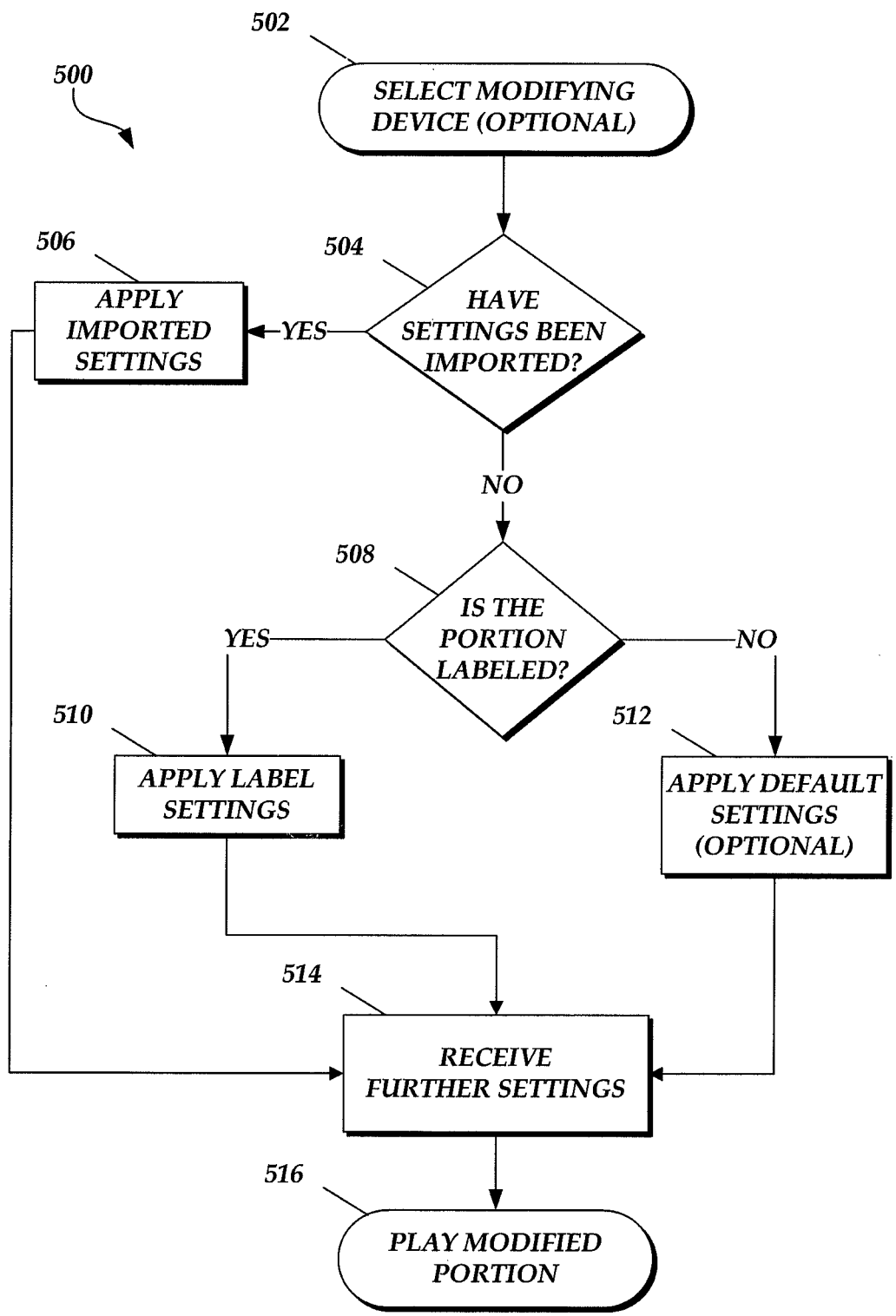
FIG. 5 is a flowchart depicting an illustrative routine for generating modified narration.

FIG. 5 depicts an illustrative process flow 500 for making modifications to a portion of narration to be played on a user computing device. In block 502, the content customization service may select which computing device processes any desired modifications to a portion of the narration. As discussed above, in some embodiments, a user computing device transmits a request to generate modified narration to a content customization server as shown in FIG. 2. The content customization server may then modify the portion of the narration, and transmit the modified narration to the user computing device. In other embodiments, the user computing device makes modifications to the narration upon the request of the user. In still further embodiments, the selection of a modifying device is not necessary, for example, in embodiments where the content customization service is embodied in a single user computing device or an in-store kiosk.

In block 504, the content customization service determines whether narration settings information has been imported for the portion of the narration to be played. For example, a user computing device may import a narration settings file stored on the user computing device or stored in an external data store maintained by the content customization service. If narration settings information has been imported, then the content customization service may set or specify the narration parameters in accordance with the narration settings information in block 506.

If no settings file has been imported, the content customization service may then check the portion of the narration for any labels that specify what the narration parameters should be for the labeled portion, as shown in block 508. If the portion is labeled, in block 510, the content customization service may set narration parameters specified by the label. Returning to the above example of a "helium label," the pitch of a portion of the narration associated with the helium label may be increased.

If no label is present, in block 512, the content customization service may optionally generate and apply default narration settings for the portion of narration to be modified. For example, for an untagged portion of the narration, the content customization service might select default narration parameters based on, for example, contextual analysis of a textual version of the narration (generated, for example, by a speech-to-text program) or an item of textual content associated with the narration. Methods for associating and synchronizing a narration and an item of textual content are described in U.S. patent application Ser. No. 13/070,313, previously incorporated herein by reference. For example, words in the portion of the narration to be modified or in an item of textual content to which the narration is synced might indicate a cheerful mood. Words such as "smile," "laugh," or "celebrate" might prompt the content customization service to assign a default "cheerful" mood to that portion of the narration.

In some embodiments, default narration settings are based on previous narration settings applied by the content customization service for a particular user. For example, the content customization service may determine that a user has used particular narration settings for many different narrations. For example, the user may have previously indicated that he or she prefers narration to be spoken at a slow pace and with a Southern accent. He or she may have applied these narration settings to many different narrations to which he or she previously listened. Accordingly, the content customization service may determine that the slow pace and Southern accent settings should be the default narration settings for that user. Accordingly, the content customization service may apply these default narration settings to make a portion of a subsequent narration to which the user may listen be spoken at a slow pace and with a Southern accent.

The user may then be afforded the opportunity to specify further settings for the narration parameters in block 514. For example, the content customization service may cause the user's computing device to display one or more user interfaces for specifying narration parameters. These further modifications may be used to generate a final set of narration parameters to be used for the narration.

The modified narration may be played in block 516. Those skilled in the art will appreciate that changes to the narration parameters as described in other blocks may be made substantially concurrently with the narration being played, e.g., the narration is modified dynamically while the user inputs changes. In other embodiments, however, the modified portion of the narration is not played until after the narration parameters have been set.

FIG. 6 depicts an illustrative user interface 600 by which a user may request or input changes to a narration. This user interface 600 (and other user interfaces) may be displayed on a user computing device as part of a software program or as part of a content page (such as a "Web page") hosted by a content customization server. A user may interact with the user interface 600 in a number of ways, depending on the computing device displaying the user interface 600. In one embodiment, the user uses an input device such as a mouse or trackball to interact with the elements of the user interface 600. In other embodiment, the user interface 600 is displayed on a user computing device with a touch screen, so that the user may interact with elements of the user interface 600 by touching the touch screen at the location where the elements are displayed. Still other structures and methods of receiving user input are within the spirit of the disclosure.

The user interface 600 may include one or more elements for displaying information about the item of content and the narration. For example, the user interface 600 may include a title indicator 602 to display the title of the item of content. The user interface 600 may also include a time indicator 604, which may include an indication of which portion of the narration is playing (e.g., a chapter) and a timestamp associated with the narration being played. The timestamp in the time indicator 604 may be incremented if the narration is being played while the user interface 600 is in use. Other indicators may be incorporated as desired. For example, indicators corresponding to the author of the item of content, genre of the item of content, date of publication of the item of content, and so forth may be displayed.

As discussed above, in some embodiments, the parameters of the narration are changed while the narration is playing. However, a user may wish to change the narration parameters while the narration is paused, and then continue the narration after setting the narration parameters to his or her liking. Accordingly, a play button 606 to start or resume the narration and a pause button 608 to pause the narration may be provided with the user interface 600. These buttons may be highlighted, inverted, or otherwise marked to indicate their state. For example, the pause button 608 may be highlighted when the narration is paused, and the play button 606 may be highlighted while the narration is playing. Other buttons for controlling the playback of the narration, such as fast forward, rewind, and skip buttons, may be provided with the user interface 600.

The user interface 600 may include elements for controlling the quantitative parameters of the narration. Generally described, quantitative parameters of narration include aspects of the narration that can be measured or quantified. For example, pitch might be measured by the average frequency in Hertz of a narrator's voice in the narration; bass and treble might be measured by the amplitude of the low and high portions of the spectrum of a narrator's voice; pace might be measured by how many syllables are spoken by a narrator in a given time frame; and contrast might be measured by the difference in intensity (in decibels, for example) between quiet portions of the narration and loud portions of the narration. Accordingly, sliders for adjusting (e.g., increasing or decreasing) these quantitative narration parameters may be provided: slider 610A to adjust pitch; slider 610B to adjust bass; slider 610C to adjust treble; slider 610D to adjust pace; and slider 610E to adjust contrast. Those skilled in the art will recognize that any user interface for inputting quantitative values will be suitable for adjusting these and other quantitative narration parameters. For example, software knobs, dials, text input fields, numeric input fields, etc. may be used to specify the levels of various quantitative narration parameters.

The user interface 600 may also include elements for control the qualitative parameters of the narration. Generally described, qualitative parameters of narration include aspects of the narration that are not necessarily measured or quantified, but rather related to a subjective quality of the narration or specific type of narration. Qualitative narration parameters may include, for example, the language of the narration, the voice of the narrator speaking the narration, the accent of the narrator, and the mood of the narrator. In the user interface 600 illustrated in FIG. 6, qualitative narration parameters may be specified by interacting with drop-down menus.

Language menu 612A enables the user to select which language he or she prefers for the narration. For example, the user may use language menu 612A to select between English, French, Spanish, or another language. The language menu 612A may include as distinct language choices one or more dialects of the same language. For example, the language menu 612A may offer choices between English as spoken in the United States (American English) and English as spoken in the United Kingdom, or between Spanish as spoken in Spain and Spanish as spoken in Latin America. In some embodiments, the selection of a language from the language menu 612A also determines the language in which the other user interface elements are rendered. For example, if the user selects French from the language menu 612A, the title indicator 602 might be rendered in French instead of English. The title indicator 602 might change from displaying the English title of the Alexandre Dumas novel "The Count of Monte Cristo" to displaying its French title, "Le Comte de Monte Cristo."

In one embodiment, selecting a language prompts the content customization service to cause a user computing device to play a pre-generated audio narration in the selected language. For example, an audiobook may have been pre-recorded in English and in French. If the user selects French from the language menu 612A, the audiobook pre-recorded in French may be played. In another embodiment, selecting a language prompts the content customization service to generate a machine translation of the narration. For example, using a speech-to-text program, the content customization service may generate a textual transcript of a pre-recorded version of the audio narration in English. Alternately, the content customization service may rely on a pre-generated English textual transcript of the audio narration, such as a narration script. The content customization could also use the text of an electronic book as a text source. In either case, if the user selects French from the language menu 612A, the content customization service may use machine translation algorithms known in the art to translate an English textual transcript into a French textual transcript. The content customization service may then generate a new audio narration or new portions of the audio narration from the French textual transcript through the use of a text-to-speech converter.

In addition to a language menu 612A, the user interface 600 may also include an accent menu 612B. The accent menu 612B may enable the user to select between one or more accents for the narration. Accents may be related to a particular region in which the selected language is typically spoken, such as American English spoken with an accent from the American South. Accents may also be related to a region which the selected language is not typically spoken, such as American English spoken with a French accent. Accents may also be related to a particular character or subculture that speaks the selected language, such as a Pirate accent or a Surfer accent, to name two examples.

In some embodiments, the content customization service employs voice waveform analysis and filters to apply accents to an audio narration. For example, the user may select a Boston accent from the accent menu 612B. In the Boston accent, the phoneme "ar" is often replaced with the phoneme "ah," such that the words "car" and "yard" may be pronounced "cah" and "yand." Accordingly, the content customization service may determine where the phoneme "ar" in the narration is spoken by using voice analysis techniques known the art. The content customization service, having identified portions of the narration waveforms where the phoneme "ar" is spoken, may splice out the "ar" waveform and splice in an "ah" audio clip in the narrator's voice, which in some embodiments is obtained from a data store housing a narrator voice library. In other embodiments, an audio filter may be applied to convert the "ar" waveform into an "ah" waveform.

In other embodiments, the content customization service substitutes phonemes based on textual analysis of the narration to apply accents. For example, using a speech-to-text program, the content customization service may generate a textual transcript of the audio narration. Alternately, the content customization service may rely on a pre-generated textual transcript of the audio narration, such as a narration script. In either case, this textual transcript could, for example, include a phonetic transcript. Returning to the above example of a Boston accent, the content customization service may then search the phonetic narration transcript for the phoneme "ar" and replace it with the phoneme "ah." The content customization service could then generate a new narration or new portions of the narration from the phonetic transcript with a text-to-speech converter. The content customization service could alternately synchronize the phonetic transcript with the original audio narration, and, while the narration plays, the content customization service could dynamically splice out "ar" phonemes spoken in the original narration when the "ah" phoneme appears in the phonetic transcript.

Rules used to create accented narration may be stored in a data store and accessed by the content customization service upon a user's request for a customization. These rules may be applied a text version of the narration such as a transcript or electronic book, or may be applied based on waveform analysis and processing of the narration. These rules could include the find-and-replace phoneme rules described above; find-and-replace word or phrase rules to reflect regional idioms (e.g., converting "you guys" in the original narration to "y'all" for a narration in a Southern accent); rules for stressing individual phonemes and/or changing pronunciations of a word based on an accent (e.g., for the word "pecan," pronouncing it "PEE-can" in a Southern accent and "puh-KAWN" in other regional accents), and other rules.

In some embodiments, the selection of a language from language menu 612A affects which accents are available in accent menu 612B. For example, if American English is selected in language menu 612A, only accents related to American English might appear in accent menu 612B. Such accents might include, for example, a Southern accent, a Boston accent, a Midwestern accent, and other regional accents associated with the United States.

The user interface 600 may also include a voice menu 612C. The voice menu 612C may enable the user to select a voice to speak the narration. Each entry in the voice menu 612C may include the name of the speaker of the voice as well as an indication of the speaker's gender. For example, a male named Sam Speaker might be listed as "Sam Speaker (M)" in one entry of the voice menu 612C, while a female named Nora Narrator might be listed as "Nora Narrator (F)" in another entry of the voice menu 612C.

Those skilled in the art will recognize that there are many methods available that provide a consumer of audio content the opportunity to select voices for that content. For example, let's say that the original audio narration for an audiobook is spoken by Sam Speaker. The user would prefer an audio narration by Nora Narrator instead. Accordingly, in one embodiment, selecting Nora Narrator from the voice menu 612C prompts a recorded version of the audiobook spoken by Nora Narrator to play, instead of the version by Sam Speaker. In another embodiment, selecting Nora Narrator for the voice prompts the content customization service to analyze and/or generate an item of textual content associated with the audiobook. The item of content could be stored in the data store, and may include, for example, an electronic book version of the audiobook, a script associated with Sam Speaker's version of the audiobook, or a transcript of Sam Speaker's version of the audiobook generated by a speech-to-text routine. The content customization service may identify the current position of the narration in the audiobook and to determine the narrator's position in the item of textual content associated with the audiobook. Methods for aligning audio content with textual content are disclosed in U.S. patent application Ser. No. 13/070,313, previously incorporated herein by reference. The content customization service may then, using clips of Nora Narrator's voice stored in the data store and a text-to-speech synthesizer, generate a new narration for part or all of the audiobook in Nora Narrator's voice. The user could then use other elements of the user interface 600 to modify the synthesized narration.

The user interface 600 may also be provided with a mood menu 612D. Moods generally may include subjective emotions associated with the item of content. For example, moods might include a cheerful mood, a nervous mood, an angry mood, a sad mood, a sleepy mood, a crazy mood, and so forth. In some embodiments, the selection of a mood from the mood menu 612D influences the settings for one or more of the quantitative narration parameters, such as those that can be set by moving sliders 610A-610E. For example, if a nervous mood is selected from the mood menu 612D, the pitch slider 610A may be moved to set the narration at a higher pitch and the pace slider 610D may be moved to set the narration at a faster pace, to reflect that a nervous speaker may talk in a higher voice and at a faster pace. In other embodiments, the selection of a mood from the mood menu 612D may prompt the content customization service to apply one or more waveform filters or effects to the audio narration. For example, if a nervous mood is selected from the mood menu 612D, the content customization service may modulate the audio narration to add a tremolo effect (similar to that produced by a "whammy bar" on an electric guitar) to make it sound like the narrator's voice is trembling. In yet further embodiments, the selection of a mood from the mood menu 612D may prompt the content customization service to insert sound effects associated with the mood into the narration. For example, the sound of a happy sigh might be added to a narration in a cheerful mood; the sound of stomping feet might be added to a narration in an angry mood; or the sound of crying might be added to narration in a sad mood.

The user interface 600 may include one or more buttons as well. A default button 614 may be provided. In one embodiment, a user interaction with default button 614 prompts the content customization service to set one or more of the quantitative narration parameters to neutral values. For example, the pitch slider 610A may be set so that it is at a zero value, instead of a positive value to produce a higher pitch or a negative value to produce a lower pitch. In another embodiment, a user interaction with default button 614 prompts the content customization service to set one or more of the qualitative narration parameters to neutral or preset values. For example, the default language and voice of a narration may be the language in which the original speaker of the narration recorded the audio narration. Accent and mood settings may be set so that by default, no mood or accent filters are applied to the narration. In yet a further embodiment, a user may specify one or more settings for narration parameters to be used as a default. When the user interacts with default button 614, the narration parameters may be set according to the user-specified default settings.

The user interface 600 may also include a restore button 616. When a user interacts with the restore button 616, previous settings specified by the user may be restored. For example, the user may be mostly content with a first group of settings for the narration parameters. However, the user may change some of the narration parameters to further customize the narration. If the user is dissatisfied with the further customization, he or she may interact with the restore button 616 to return to the first group of settings for the narration parameters.

The user interface 600 may also include an apply button 618. In some embodiments, the user may specify settings for various narration parameters while the narration is playing. In one embodiment, if the user changes a setting for a narration parameter, the change is applied immediately while the narration plays. In another embodiment, the changes are not applied until the user interacts with the apply button 618.

As discussed above, the content processing service may enable users to transmit or access narration settings information over an electronic network. Accordingly, the user interface 600 may be provided with an import button 620 and an export button 622. By interacting with the import button 620, the user can, for example, request narration settings information from a content customization server or data store associated with the content customization service, as shown in and as described with respect to FIG. 3. In response to the request, the content customization service could then transmit the narration settings information to the user computing device. The user might also interact with the import button 620 to access narration settings information stored on a data store on his or her user computing device.

By interacting with the export button 622, the user can save his or her settings for the narration parameters, and then optionally store them on his or her user computing device or transmit them over an electronic network. For example, the user could transmit his or her settings to a content customization server or data store associated with the content customization service, as shown in and as described with respect to FIG. 3A. The user may also transmit his or her narration settings information directly to another user computing device.

FIG. 7 depicts an example user interface 700 that may be used to set narration parameters for different portions of the narration. The user interface 700 may include a title indicator 702 as well as instructions for the user on how to interact with the user interface. In the user interface 700 shown, for instance, the user may interact with some elements by tapping and with other elements by dragging. The user may select a portion of the narration to be modified, and then drag a setting to a slot corresponding to that chapter.

In this illustrative user interface 700, the narration associated with the item of content is broken down by chapter. Thus, for a narration containing four chapters, there may be four slots, shown here as slots 704A-704D. The user may select a previously generated setting 706A-706C, and then drag the selected setting to the desired chapter slot, for example. For example, here, the user has chosen Setting A to fill slot 704A. The user also has the option of generating a new setting by interacting with the new setting button 708. By selecting the new setting button 708, the user may be taken to a user interface, such as user interface 600, to set narration parameters for a portion of the narration. The generated settings may then appear next to the previously generated settings 706A-706C and be dragged to a slot 704A-704D.

In some embodiments, a default or label setting is selected for a slot. As discussed above with respect to FIG. 5, a portion of a narration may be labeled to indicate desirable narration settings for that portion. In this example, Chapter 2 of the narration may have been labeled by the content customization service with a "cheerful" label. As also discussed above with respect to FIG. 5, default settings may be based on a contextual analysis of the narration or an item of textual content associated with the narration. For example, a "cheerful" mood may be selected as a default based on the presence of the words "laugh," "smile," or "celebrate" in the narration or item of textual content. In some embodiments, the user may apply default and/or labeled settings to all portions of the narration by pressing the recommended button 710.

If a setting has already been selected for a slot, the user may interact with the assigned setting to make further modifications. For example, in the user interface 700, slot 704C has been assigned Setting B by the user. The user may then interact with the filled slot 704C (perhaps by clicking on it or tapping it) to make further changes to Setting B for that slot, resulting in Setting B'. For example, by interacting with filled slot 704C, the user may be taken to the illustrative user interface 600 shown in FIG. 6 and prompted to set one or more narration parameters. The user may also interact with and modify default settings, such as the default setting shown in slot 704B. Some portions of the narration may be locked such that the narration parameters of that portion of the narration cannot be changed. For example, a rights-holder may place a "locked" label on a portion of the narration such that the narration parameters of that portion of the narration may not be changed by a user. As shown in slot 704D, the user may not be allowed to make changes to Chapter 4, which may have a locked label placed on it. Additionally, the presence of a locked label may preclude a user from applying a previously generated setting to that portion of the narration. As discussed above, the content customization service may offer to provide fully locked, partially unlocked, or completely unlocked narrations for an item of content.

Though the narration is broken down into portions corresponding to chapters in the user interface 700, those skilled in the art will appreciate that other narration portions corresponding to other measures may be chosen. For example, the narration may be broken down into portions corresponding to an increment of time, such as one or more seconds, minutes, or hours. The narration may also be broken down by a speaker of the narration. Thus, the user may specify narration parameters to be applied on a character-by-character basis if desired. For example, a first portion of the narration may correspond to a male character's dialogue, and a second portion of the narration may correspond to a female character's dialogue. The user may want Sam Speaker's voice for the first portion of the narration and Nora Narrator's voice for the second portion of the narration, and the narration parameters may be set for each portion accordingly.

The user interface 700 may include an import button 712 and an export button 714. As discussed above, narration settings information specifying narration parameters for one or more portions of the narration may be stored on a content customization server associated with the content customization service, or stored on a user computing device. By interacting with the import button 712, the user may request a narration settings information from a content customization server associated with the content customization service, as shown in and described with respect to FIG. 4. The content customization server may then transmit the narration settings information to the user computing device. The user may also interact with the import button 712 to access narration settings information stored on a data store on his or her user computing device.

In some embodiments, narration settings information includes settings for many different portions of a specific item of content. Thus, a user's interaction with the import button 712 may prompt the user to select narration settings information, whose settings would be propagated into one or more of the slots 704A-704D. In other embodiments, narration settings information may be used with many items of content. A user's interaction with the import button 712 may prompt the user to select narration settings information to be imported. After the user selects the narration settings information, the user interface 700 may display, for example, a "Setting D," which may appear next to previously generated settings 706A-706C. The user may then drag Setting D to a slot 704A-704D.

The export button 714 may be used to transmit narration settings information specifying narration parameters for one or more portions of the narration over an electronic network. For example, a narration settings file stored on a user computing device may be transmitted to a content customization server associated with the content customization service or transmitted to a second user computing device.

The user may wish to save his or her custom settings for the narration parameters of each portion of the narration. Accordingly, the user may interact with a save and continue button 716 to save the custom settings and to play the audio narration. The user may also interact with a save for later button 718 to save the custom settings without playing the audio narration. The user may also wish to clear all settings from slots 704A-704D, and may interact with a clear all button 720 to do so.

Figure 8:
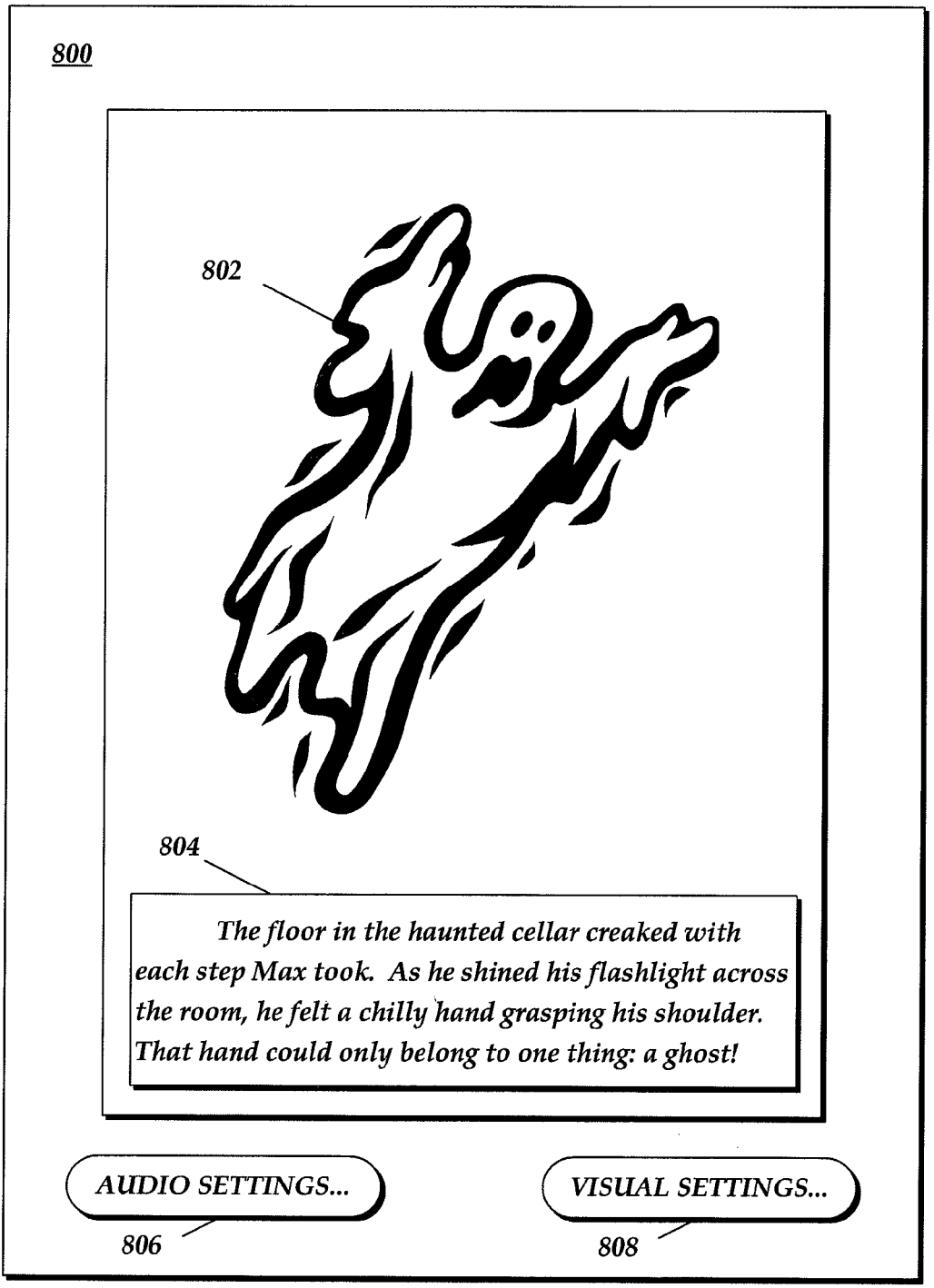
FIG. 8 is a pictorial diagram of an illustrative user interface including a visual indicator.

In addition to the user interfaces for generating narration settings shown in FIG. 6, and FIG. 7, a user interface may be provided that includes one or more visual indicators or textual indicators that may complement or foreshadow the narration. FIG. 8 depicts an illustrative user interface 800 that includes a visual indicator 802. In some embodiments, the visual indicator 802 is an image related to the narration. For example, for narration related to a haunted cellar, a visual indicator 802 including a ghost may be displayed. Other examples of visual indicators may include lights in one or more colors. For example, for narration relating to a volcanic eruption, red or orange lights may be displayed on the user interface 800 or on a user computing device to complement an image of a lava flow. For narration relating to a lightning storm, a white light may flash to complement an image of a lightning bolt.

The content customization service may determine what visual indicator to display based on a label of the particular portion of the narration being played, based on a user selection of an image, or based on contextual analysis of the narration being played. For an example of selecting a visual indicator based on contextual analysis, the content customization service might synchronize the narration with a textual version of the item of content with which the narration is affiliated, and then find an image word in the textual narration. As the narration plays, the content customization service follows along in the text. When the content customization service hits the image word in the text and when the narrator speaks the image word, the visual indicator 802 corresponding to the image word may be displayed. Thus, when the narrator says the word "ghost," a ghost visual indicator 802 may be displayed. More information on synchronizing audio and textual content may be found in U.S. patent application Ser. No. 13/070,313, previously incorporated herein by reference.

The user interface 800 may optionally include a display of the text 804. In this way, the user can read a textual version of the narration while listening to the audio version of the narration. The portion of the text displayed in display 804 may be synced to the audio narration, as described above. In some embodiments, an indicator that follows the text as it is narrated may be displayed. For example, the text portion may be progressively underlined in the text display 804 so that each word is underlined when it is spoken in the narration. In other embodiments, the text portion is progressively bolded in the text display 804 so that each word is bolded when it is spoken in the portion of the narration. Still other ways to help the user align the narration with the text are possible, such as a "bouncing ball" that skips over each word as it is spoken in the narration. In some embodiments, the user selects whether text display 804 is enabled or disabled (e.g., whether text display 804 appears in the user interface 800 or does not appear in the user interface 800).

The user interface 800 may also include an audio settings button 806 and a visual settings button 808. By interacting with these buttons, the user may be taken to a user interface for specifying narration settings or visual indicator settings. For example, by interaction with audio settings button 806, the user may be taken a user interface 600 as shown in FIG. 6 or a user interface 700 as shown in FIG. 7. By interacting with the visual settings button 808, the user may be directed to a user interface that allows him or her to select an image or lighting for visual indicator 802 and to select whether text display 804 is enabled or disabled.

Those skilled in the art will recognize that the user interfaces shown in and described with respect to FIG. 6, FIG. 7, and FIG. 8 may also be displayed on a rights-holder computing device so that the rights-holder may create a custom narration for an item of content. In this way, the rights-holder may create an "authoritative" version of the narration by selecting settings desired by the rights-holder. The rights-holder may also be able to designate one or more portions of the narration to be locked by using the user interfaces, for example, by interacting with the user interface 700 shown in FIG. 7 assign locked labels to one or more chapters, such as Chapter 4 as shown in slot 704D. A user computing device would not be able to change the narration parameters specified or set by the rights-holder in a locked portion of the narration.

The user interfaces shown in and described with respect to FIG. 6, FIG. 7, and FIG. 8 may additionally be incorporated into a frontend interface that directs input or customization instructions to the content customization service. In one embodiment, the user interfaces described above are displayed on a content page hosted on a network. When the content page is accessed by a user through a user computing device (or by a rights-holder on a rights-holder computing device), specifications or settings for narration parameters may be made through these user interfaces. In response to receiving the user input, the content page may call one or more functions of the content customization service through an application programming interface (API). For example, the content customization server may be directed through remote procedure calls to carry out one or more narration modifications. Those skilled in the art will recognize that the content page need not be hosted by the content customization server.

In another embodiment, the user interfaces shown in and described with respect to FIG. 6, FIG. 7, and FIG. 8 are incorporated into client software installed on a user computing device or a rights-holder computing device. The client software may receive input through these user interfaces, and, in response, direct remote procedure calls to the content customization server. For example, the content customization server may be directed through remote procedure calls to carry out one or more narration modifications.

All of the methods and processes described above may be embodied in, and fully automated via, software code modules executed by one or more general purpose computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Conjunctive language such as the phrase "at least one of X, Y and Z," unless specifically stated otherwise, is otherwise understood with the context as used in general to convey that an item, term, etc. may be any combination of X, Y, and/or Z. Thus, such conjunctive language is not generally intended to imply that certain embodiments require at least one of X, at least one of Y, and at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted or executed out of order from that shown or discussed, including substantially concurrently or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

The invention claimed is:

1. A computer-implemented method for distributing narration customizations, the computer-implemented method comprising:

under control of one or more computing devices including a processor configured with specific computer-executable instructions:

obtaining a plurality of narration settings files;

assigning catalog information to each of the plurality of narration settings files, wherein the catalog information assigned to each of the plurality of narration settings files identifies a creator of the narration settings file;

storing, to an electronic data store, the plurality of narration settings files using the catalog information assigned plurality of narration settings files;

receiving, from a user computing device, a request for a requested narration settings file, the request including catalog information regarding the requested narration settings file;

selecting, from the plurality of narration settings files in the electronic data store, the requested narration settings file using the catalog information regarding the requested narration settings file and the catalog information assigned to each of the plurality of narration settings files; and providing the requested narration settings file to the user computing device over an electronic network.

2. The computer-implemented method of claim 1 further comprising:

identifying at least one other narration settings file using the catalog information assigned to each of the plurality of narration settings files; and sending, to the user computing device, a notification indicating an availability of the at least one other narration settings file.

3. The computer-implemented method of claim 2, further comprising:

identifying an item of content with which each narration settings file of the plurality of narration settings files is associated using the catalog information assigned to each of the plurality of narration settings files.

4. The computer-implemented method of Claim 3, wherein:

the requested narration settings file of the plurality of narration settings files is associated with a first narration of a first item of content; and the at least one other narration settings file of the plurality of narration settings files is associated with a second narration of a second item of content.

5. The computer-implemented method of claim 4, wherein the first item of content and the second item of content share at least one of a common author, common series, and a common genre.

6. The computer-implemented method of claim 3, wherein a creator of the at least one other narration settings file is at least one of a narrator of the item of content with which the requested narration settings file is associated and an author of the item of content with which the requested narration settings file is associated.

7. The computer-implemented method of claim 2, wherein the requested narration settings file and the at least one other narration settings file have an identical creator.

8. The computer-implemented method of claim 1, further comprising:

accessing a social graph associated with a user of the user computing device, the social graph identifying a plurality of individuals associated with the user; and identifying the requested narration settings file whose creator is an individual in the social graph using the catalog information assigned to each of the plurality of narration settings files.

9. The computer-implemented method of claim 1, wherein the the requested narration settings file comprises settings for one or more visual indicators to be displayed by the user computing device.

10. A system for customizing an item of content comprising an original narration, the system comprising:

an electronic data store configured to store the item of content; and a computing device including a processor in communication with the electronic data store, the computing device configured to:

access the original narration from the electronic data store;

transmit a request for a narration setting associated with a social graph of a user of the computing device, wherein the social graph identifies a plurality of individuals associated with the user;

identify, from the social graph, an individual of the plurality of individuals, wherein the individual has generated at least one narration setting file of a plurality of narration setting files, the at least one narration setting file including a narration setting specified by the individual of the plurality of individuals;

obtain the at least one narration setting file generated by the individual; and modify the original narration according to the narration setting specified by the individual of the plurality of individuals and included in the at least one narration setting file to form a modified narration.

11. The system of claim 10, wherein the computing device is further configured to transmit a notification indicating an availability of the modified narration to a second computing device.

12. The system of claim 11, wherein the at least one narration setting file generated by the individual is obtained from the second computing device.

13. The system of claim 10, wherein at least one other narration setting file of the plurality of narration setting files for the item of content is obtained from a rights-holder of the item of content.

14. The system of claim 13, wherein the computing device is further configured to prevent modifications to at least a portion of the original narration if said modifications are not authorized by the rights-holder of the item of content.

15. A non-transitory computer-readable medium for customizing content, the non-transitory computer-readable medium having a computer-executable component configured to:

receive a request from a computing device including a processor to customize an original narration;

select a narration settings file from an electronic data store configured to store a plurality of narration settings files, wherein the narration settings file comprises at least one narration parameter;

receive at least one modification to the at least one narration parameter, wherein the at least one modification is specified through a user interface displayed on the computing device;

from an updated narration settings file comprising at least one modified narration parameter, wherein the at least one modified narration parameter comprises the at least one narration parameter as modified in accordance with the at least one modification;

modify the original narration in accordance with the updated narration settings file in order to form a modified narration for the item of content; and store the updated narration settings file to the electronic data store.

16. The non-transitory computer-readable medium of claim 15, wherein the computer-executable component is further configured to transmit a notification indicating an availability of the updated narration settings file over an electronic network to at least one other computing device.

17. The non-transitory computer-readable medium of claim 16, wherein the computer-executable component is further configured to prevent modifications to the at least one narration parameter of at least a portion of the original narration.

18. The non-transitory computer-readable medium of claim 15, wherein the computer-executable component is further configured to select the narration settings file from the electronic data store based at least in part on input from a human interaction task system.

19. The non-transitory computer-readable medium of claim 15, wherein the computer-executable component is further configured to select the narration settings file from the electronic data store based at least in part on a rating of the narration settings file.

20. The non-transitory computer-readable medium of claim 15, wherein the computer-executable component is further configured to select the narration settings file from the electronic data store based at least in part on user input made through the computing device.

21. A system for sharing audiobook customizations, the system comprising:
- an electronic data store configured to store one or more audiobook narration settings files; and
- a server computing device in communication with the electronic data store, the server computing device configured to:
  - receive, from a first user computing device, a request for an audiobook narration settings file;
  - in response to the request, access a first social graph, the first social graph being affiliated with a user of the first user computing device and comprising a plurality of individuals related to the user of the first user computing device;
  - identify, from the first social graph, a first individual of the plurality of individuals related to the user of the first user computing device, wherein the first individual has generated at least one audiobook narration settings file, the at least one audiobook narration settings file including audiobook narration settings specified by the first individual;
  - identify the at least one audiobook narration settings file generated by the first individual identified in the first social graph;
  - retrieve, from the electronic data store, the at least one audiobook narration settings file; and
  - transmit the at least one audiobook narration settings file to the first user computing device.

22. The system of claim 21, wherein the server computing device is further configured to:
- identify, from the first social graph, a second individual of the plurality of individuals related to the user of the first user computing device, wherein the second individual is a user of a second user computing device;
- transmit, to the second computing device, a recommendation to request the at least one audiobook narration settings file, the at least one audiobook narration settings file including the audiobook narration settings specified by the first individual;
- receive, from the second user computing device, a request for the at least one audiobook narration settings file;
- in response to the request, retrieve, from the electronic data store, the at least one audiobook narration settings file; and
- transmit the at least one audiobook narration settings file to the second user computing device.

23. The system of claim 21, wherein the server computing device is further configured to:
- access a second social graph, the second social graph being affiliated with a user of a second computing device and comprising a plurality of individuals related to the user of the second computing device;
- determine that the first individual identified from the first social graph is also in the second social graph,
- transmit, to the second computing device, a recommendation to request the at least one audiobook narration settings file, the at least one audiobook narration settings file including the audiobook narration settings specified by the first individual;
- receive, from the second user computing device, a request for the at least one audiobook narration settings file;
- in response to the request, retrieve, from the electronic data store, the at least one audiobook narration settings file; and
- transmit the at least one audiobook narration settings file to the second user computing device.

24. The system of claim 21, wherein the server computing device is further configured to:
- access a second social graph, the second social graph being affiliated with the first individual and comprising a plurality of individuals related to the first individual;
- determine that a user of a second computing device is in the first social graph and the second social graph,
- transmit, to the second user computing device, a recommendation to request the at least one audiobook narration settings file, the at least one audiobook narration settings file including the audiobook narration settings specified by the first individual identified in the first social graph;
- receive, from the second user computing device, a request for the at least one audiobook narration settings file;
- in response to the request, retrieve, from the electronic data store, the at least one audiobook narration settings file; and
- transmit the at least one audiobook narration settings file to the second user computing device.

* * * * *

UNITED STATES PATENT AND TRADEMARK OFFICE
CERTIFICATE OF CORRECTION

PATENT NO. : 9,075,760 B2
APPLICATION NO. : 13/465871
DATED : July 7, 2015
INVENTOR(S) : Douglas C. Hwang Page 1 of 1

It is certified that error appears in the above-identified patent and that said Letters Patent is hereby corrected as shown below:

In column 24 at line 67, In Claim 1, after "assigned" insert --to each of the--.

In column 25 at line 58, In Claim 9, change "the the" to --the--.

Signed and Sealed this
Sixteenth Day of August, 2016

Michelle K. Lee
*Director of the United States Patent and Trademark Office*